(12) United States Patent
Grube et al.

(10) Patent No.: US 9,830,222 B2
(45) Date of Patent: Nov. 28, 2017

(54) ADJUSTING A DATA STORAGE ADDRESS MAPPING IN A MAINTENANCE FREE STORAGE CONTAINER

(71) Applicant: Cleversafe, Inc., Chicago, IL (US)

(72) Inventors: Gary W. Grube, Barrington Hills, IL (US); Timothy W. Markison, Mesa, AZ (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 14/844,145

(22) Filed: Sep. 3, 2015

(65) Prior Publication Data

US 2015/0378827 A1 Dec. 31, 2015

Related U.S. Application Data

(63) Continuation of application No. 13/450,186, filed on Apr. 18, 2012, now Pat. No. 9,141,458.

(60) Provisional application No. 61/483,852, filed on May 9, 2011.

(51) Int. Cl.
*G06F 11/00* (2006.01)
*G06F 11/10* (2006.01)
*G06F 11/07* (2006.01)

(52) U.S. Cl.
CPC ........ *G06F 11/1092* (2013.01); *G06F 11/076* (2013.01); *G06F 11/0727* (2013.01); *G06F 11/0793* (2013.01); *G06F 11/0775* (2013.01)

(58) Field of Classification Search
CPC ............. G06F 11/2007; G06F 11/1469; G06F 11/1456; G06F 11/076; G06F 11/1092; G06F 11/0727
See application file for complete search history.

(56) References Cited

U.S. PATENT DOCUMENTS

| | | | | |
|---|---|---|---|---|
| 7,636,724 | B2 * | 12/2009 | de la Torre | H03M 7/30 |
| 2008/0183975 | A1 * | 7/2008 | Foster | G06F 11/1076 711/153 |
| 2010/0274983 | A1 * | 10/2010 | Murphy | G06F 11/1456 711/162 |
| 2012/0290877 | A1 * | 11/2012 | Grube | G06F 11/0727 714/15 |

* cited by examiner

*Primary Examiner* — Philip Guyton
(74) *Attorney, Agent, or Firm* — Garlick & Markison; Timothy W. Markison

(57) ABSTRACT

A method includes sending, by a computing device, an access request to one or more site controllers. The method further includes identifying, by a site controller, storage containers based on DSN addresses. The method includes sending, by the site controller, the access request to the identified storage containers. The method includes interpreting, by a container controller, the access request to identify storage units affiliated with some of the DSN addresses. The method includes determining, by the container controller, whether the storage units are in a storage failure mode. The method includes when the storage units are in the storage failure mode, determining, by the container controller, whether to rebuild, to change virtual to physical address mapping, or to migrate encoded data slices. The method includes, when the encoded data slices are to be rebuild, facilitating, by the container controller, rebuilding of the encoded data slices.

16 Claims, 19 Drawing Sheets computing system 10

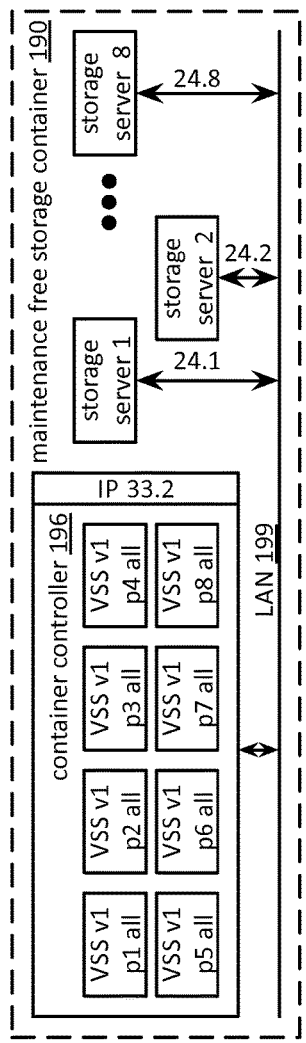

FIG. 9B

| slice name to next location table 274 | | |
|---|---|---|
| slice name range 276 | next server ID 278 | next server IP 280 |
| v1 p1 all | SS1 | 24.1 |
| v1 p2 all | SS2 | 24.2 |
| v1 p3 all | SS3 | 24.3 |
| v1 p4 all | SS4 | 24.4 |
| v1 p5 all | SS5 | 24.5 |
| v1 p6 all | SS6 | 24.6 |
| v1 p7 all | SS7 | 24.7 |
| v1 p8 all | SS8 | 24.8 |

FIG. 9C

| slice name to next location table 282 | | |
|---|---|---|
| slice name range 276 | next server ID 278 | next server IP 280 |
| v1 p1 75% | SS1 | 24.1 |
| v1 p1 25% | SS5 | 24.5 |
| v1 p2 75% | SS2 | 24.2 |
| v1 p2 25% | SS6 | 24.6 |
| v1 p3 75% | SS3 | 24.3 |
| v1 p3 25% | SS7 | 24.7 |
| v1 p4 75% | SS4 | 24.4 |
| v1 p4 25% | SS8 | 24.8 |
| v1 p5 50% | SS5 | 24.5 |
| v1 p5 50% | SS6 | 24.6 |
| v1 p6 50% | SS7 | 24.7 |
| v1 p6 50% | SS8 | 24.8 |
| v1 p7 all | - | - |
| v1 p8 all | - | - |

FIG. 9D

| slice name to next location table 284 | | |
|---|---|---|
| slice name range 276 | next server ID 278 | next server IP 280 |
| v1 p1 50% | SS1 | 24.1 |
| v1 p1 50% | SS5 | 24.5 |
| v1 p2 50% | SS2 | 24.2 |
| v1 p2 50% | SS6 | 24.6 |
| v1 p3 50% | SS3 | 24.3 |
| v1 p3 50% | SS7 | 24.7 |
| v1 p4 50% | SS4 | 24.4 |
| v1 p4 50% | SS8 | 24.8 |
| v1 p5 all | - | - |
| v1 p6 all | - | - |
| v1 p7 all | - | - |
| v1 p8 all | - | - |

FIG. 9E

| container 1 | | |
|---|---|---|
| slice name to next location table 282 | | |
| slice name range 276 | next server ID 278 | next server IP 280 |
| v1 p1 75% | SS1 | 24.1 |
| v1 p1 25% | SS5 | 24.5 |
| v1 p2 75% | SS2 | 24.2 |
| v1 p2 25% | SS6 | 24.6 |
| v1 p3 75% | SS3 | 24.3 |
| v1 p3 25% | SS7 | 24.7 |
| v1 p4 75% | SS4 | 24.4 |
| v1 p4 25% | SS8 | 24.8 |
| v1 p5 50% | SS5 | 24.5 |
| v1 p5 50% | SS6 | 24.6 |
| v1 p6 50% | SS7 | 24.7 |
| v1 p6 50% | SS8 | 24.8 |
| v1 p7 all | - | - |
| v1 p8 all | - | - |

FIG. 9G

| container 1 | | |
|---|---|---|
| slice name to next location table 288 | | |
| slice name range 276 | next server ID 278 | next server IP 280 |
| v1 p1 1$^{st}$ 50% | SS1 | 24.1 |
| v1 p2 1$^{st}$ 50% | SS2 | 24.2 |
| v1 p3 1$^{st}$ 50% | SS3 | 24.3 |
| v1 p4 1$^{st}$ 50% | SS4 | 24.4 |
| v1 p5 1$^{st}$ 50% | SS5 | 24.5 |
| v1 p6 1$^{st}$ 50% | SS6 | 24.6 |
| v1 p7 1$^{st}$ 50% | SS7 | 24.7 |
| v1 p8 1$^{st}$ 50% | SS8 | 24.8 |

| container 2 | | |
|---|---|---|
| slice name to next location table 290 | | |
| slice name range 276 | next server ID 278 | next server IP 280 |
| v1 p1 2$^{nd}$ 50% | SS1 | 29.1 |
| v1 p2 2$^{nd}$ 50% | SS2 | 29.2 |
| v1 p3 2$^{nd}$ 50% | SS3 | 29.3 |
| v1 p4 2$^{nd}$ 50% | SS4 | 29.4 |
| v1 p5 2$^{nd}$ 50% | SS5 | 29.5 |
| v1 p6 2$^{nd}$ 50% | SS6 | 29.6 |
| v1 p7 2$^{nd}$ 50% | SS7 | 29.7 |
| v1 p8 2$^{nd}$ 50% | SS8 | 29.8 |

FIG. 9H

ADJUSTING A DATA STORAGE ADDRESS MAPPING IN A MAINTENANCE FREE STORAGE CONTAINER

CROSS REFERENCE TO RELATED PATENTS

The present U.S. Utility Patent Application claims priority pursuant to 35 U.S.C. §120 as a continuation of U.S. Utility application Ser. No. 13/450,186, entitled "ADJUSTING A DATA STORAGE ADDRESS MAPPING IN A MAINTENANCE FREE STORAGE CONTAINER", filed Apr. 18, 2012, issuing as U.S. Pat. No. 9,141,458 on Sep. 22, 2015, which claims priority pursuant to 35 U.S.C. §119(e) to U.S. Provisional Application No. 61/483,852, entitled "CONTAINER BASED DISPERSED STORAGE NETWORK", filed May 9, 2011, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

Figure 10:
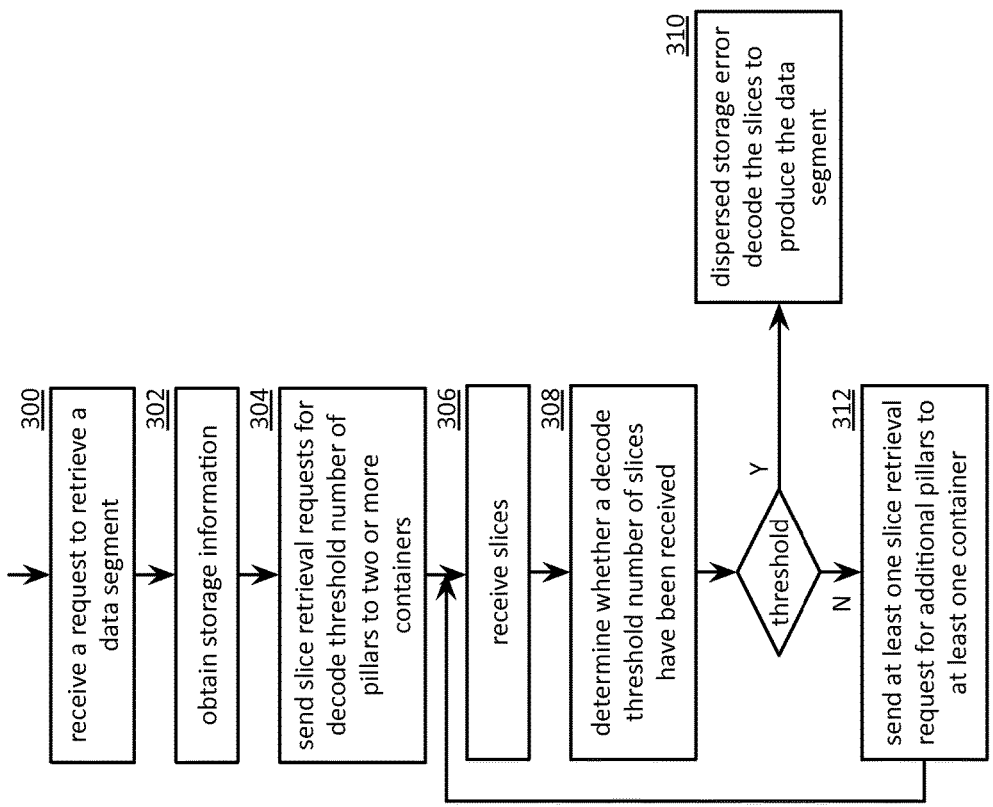
Figure 11:
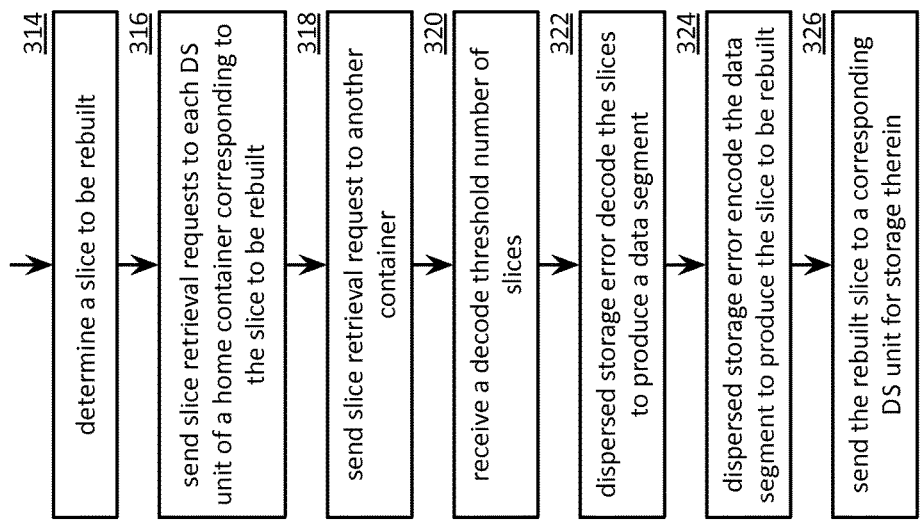
Figure 12A:
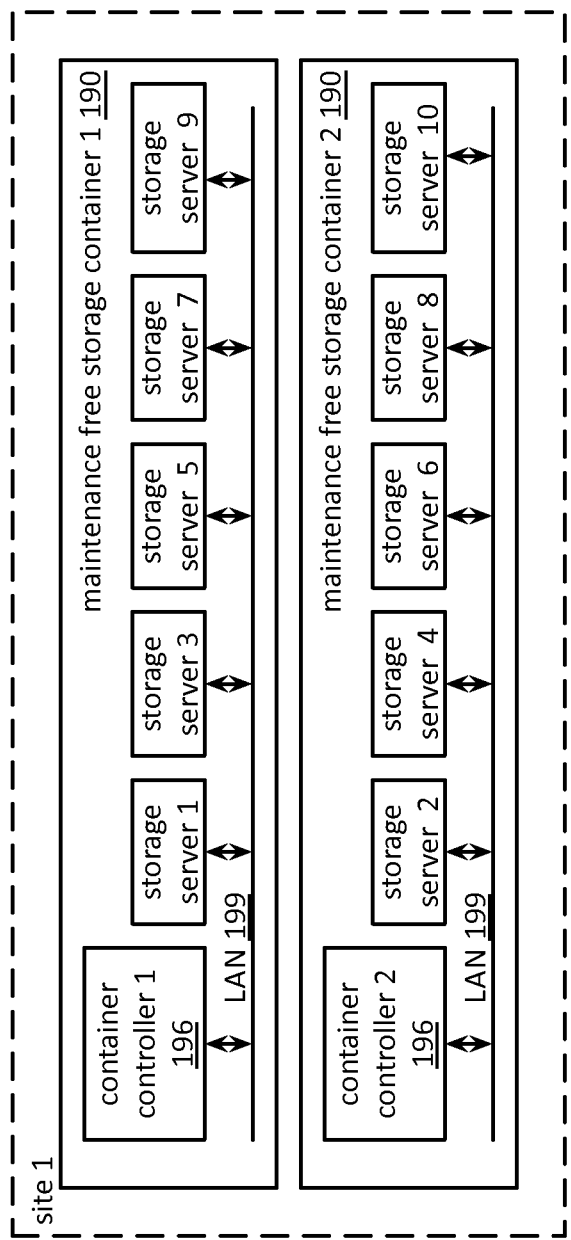
Figure 12B:
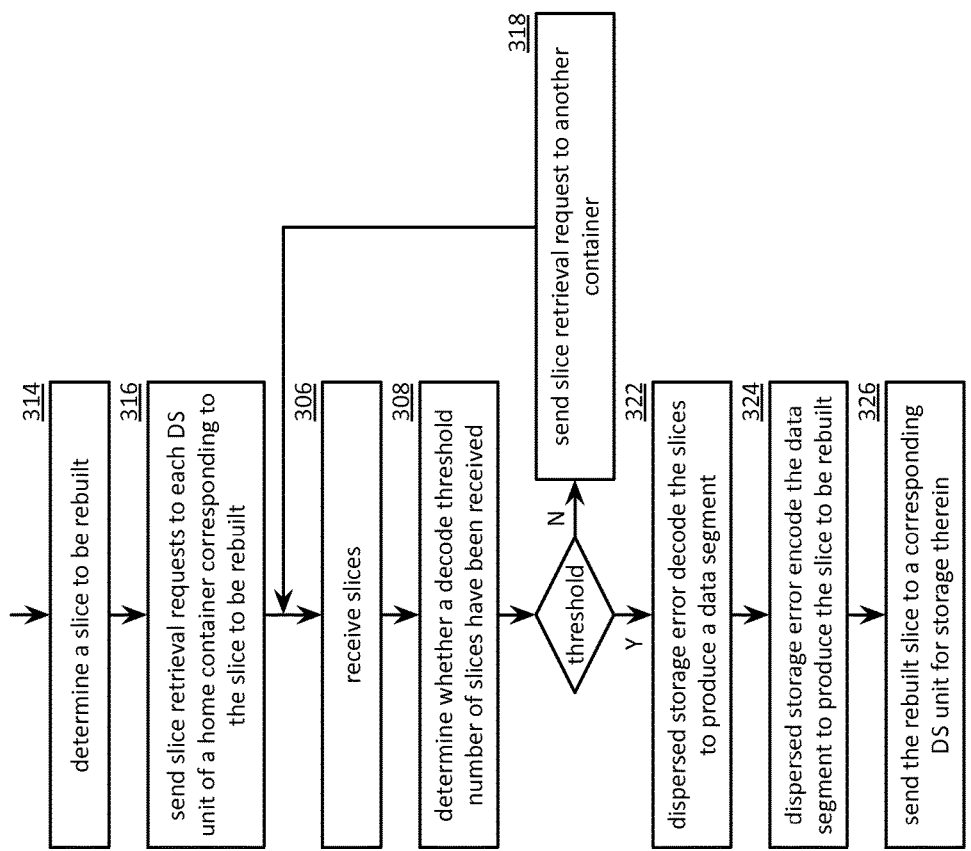

FIG. 9H includes tables illustrating more examples of slice name to next location tables in accordance with the present invention;

FIG. 9I is a schematic block diagram of another embodiment of a computing system in accordance with the present invention;

FIG. 10 is a flowchart illustrating an example of retrieving a data segment in accordance with the present invention;

FIG. 11 is a flowchart illustrating an example of rebuilding an encoded slice in accordance with the present invention;

FIG. 12A is a schematic block diagram of another embodiment of a computing system in accordance with the present invention; and FIG. 12B is a flowchart illustrating another example of rebuilding an encoded slice in accordance with the present invention.

DETAILED DESCRIPTION OF THE INVENTION

Figure 1:
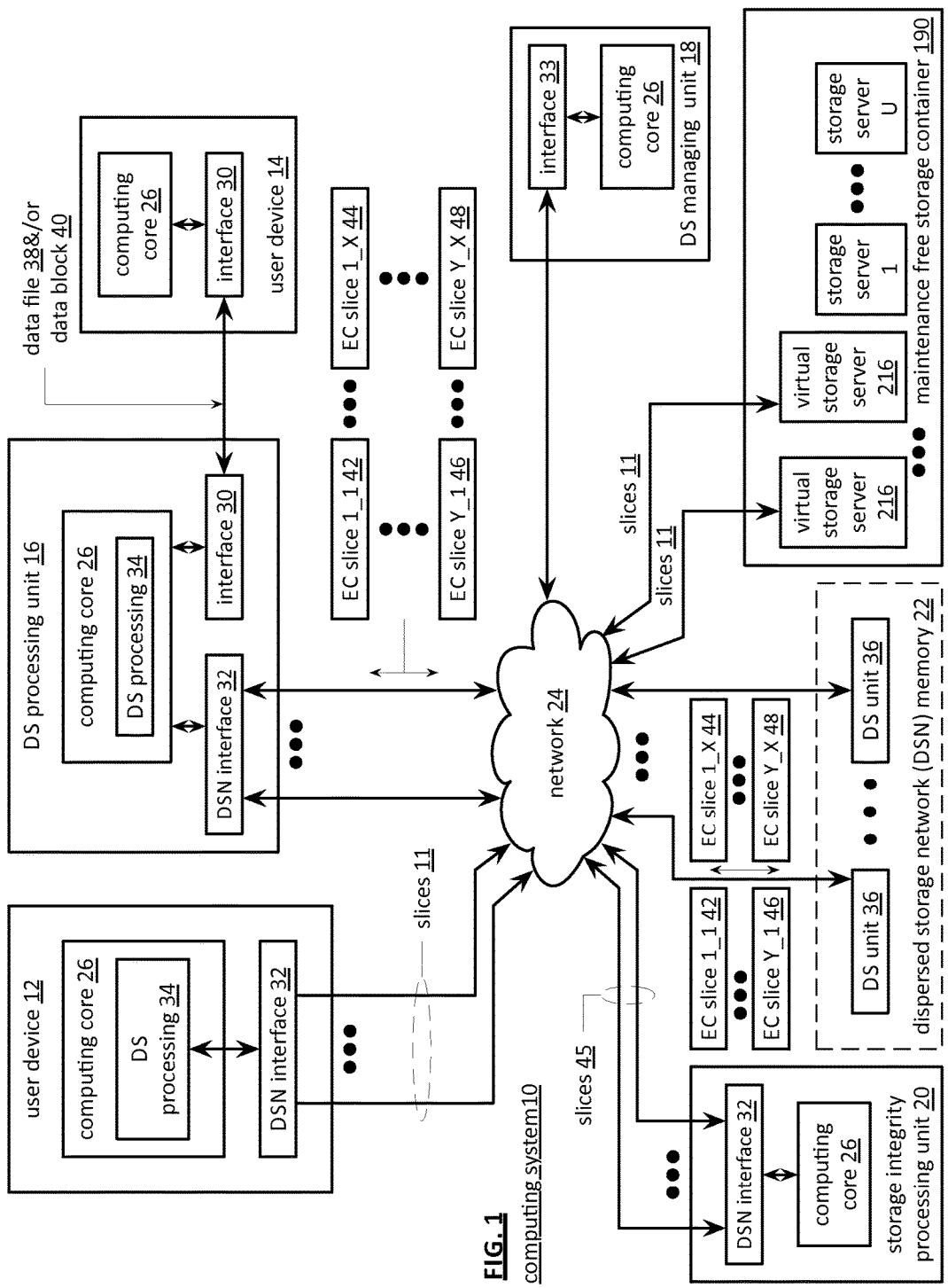
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, a distributed storage network (DSN) memory 22 coupled via a network 24 and at least one maintenance free storage container 190 coupled via network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the computing system 10. Each of the DS units 36 includes a processing module and memory and may be located at a geographically different site than the other DS units (e.g., one in Chicago, one in Milwaukee, etc.). The maintenance free storage container 190 includes a plurality of virtual storage servers 216 and a plurality of storage servers 1-U for storing data of the computing system 10. The maintenance free storage container 190 allows for multiple storage servers of the plurality of storage servers 1-U to be in a failure mode without replacement. Each of the virtual store servers 216 includes a processing module to transfer data (e.g., slices 11) between the computing system 10 and at least some of the storage servers 1-U in accordance with a mapping. Each storage server of the plurality of storage servers 1-U includes a processing module and memory to store data (e.g., slices 11).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to at least one of a plurality of DS units 36 of the DSN memory 22 and a plurality of virtual storage servers 216 of the maintenance free storage container 190 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to at least one of the DSN memory 22 and the maintenance free storage container 190 via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
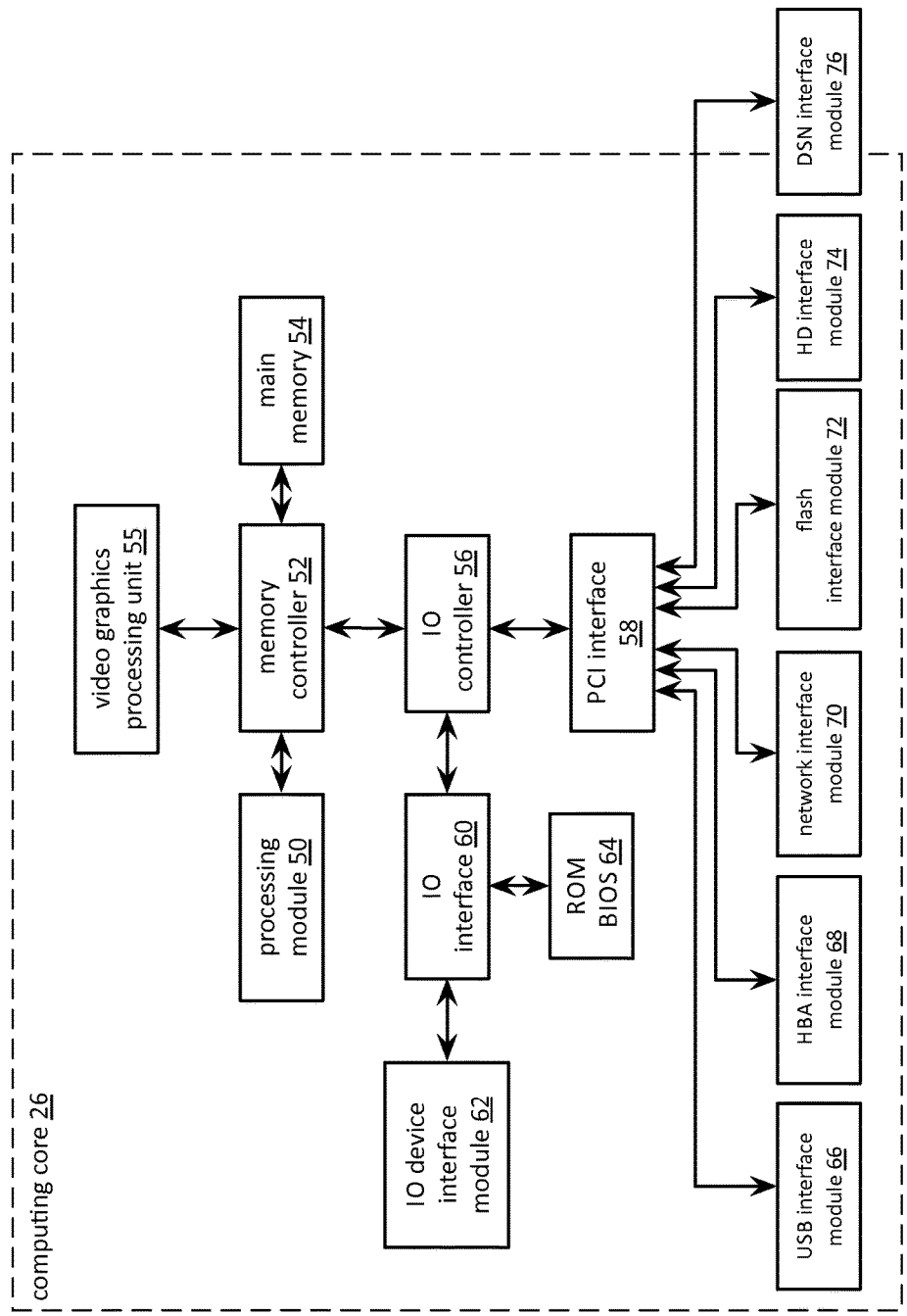
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
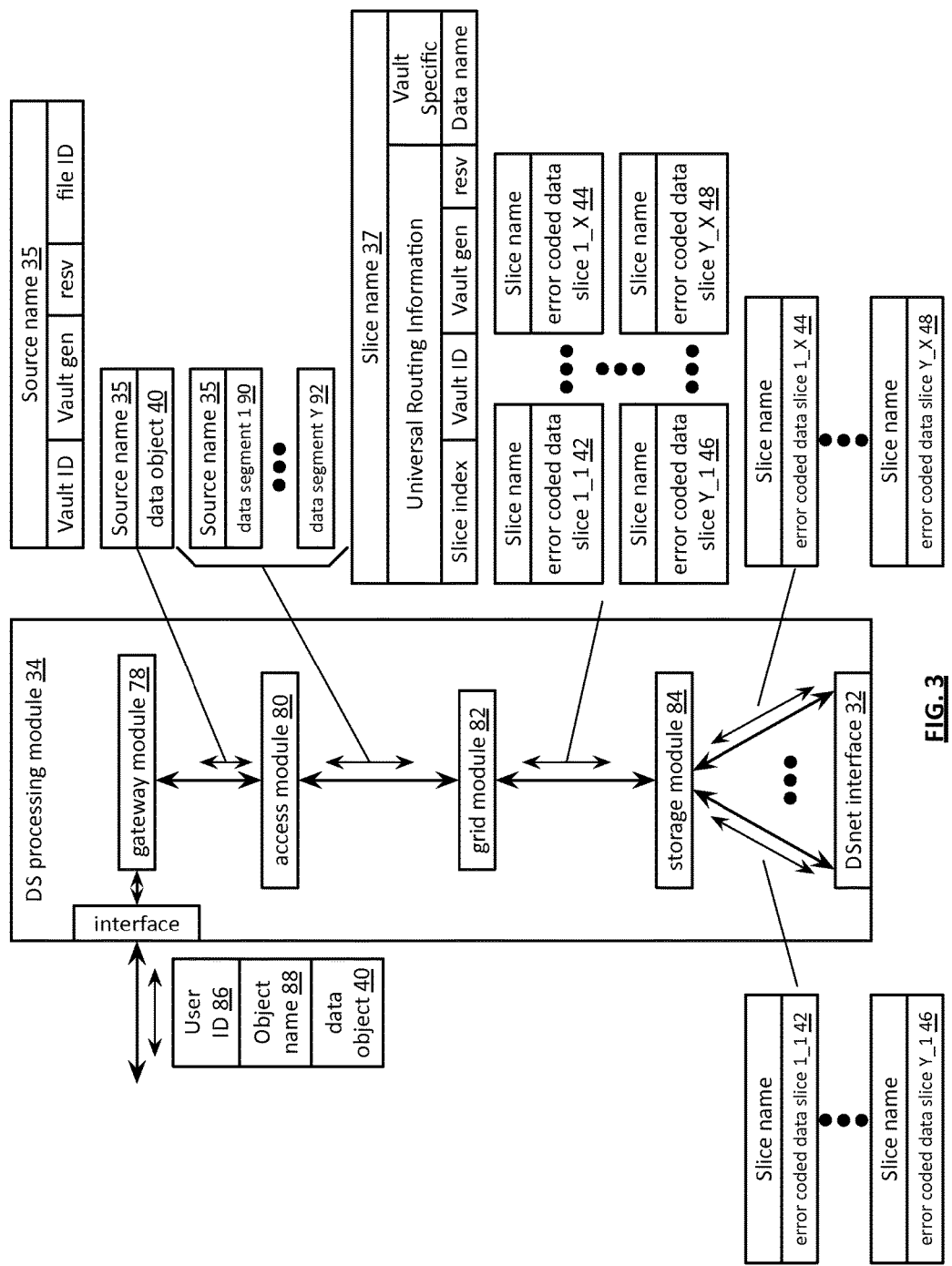
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
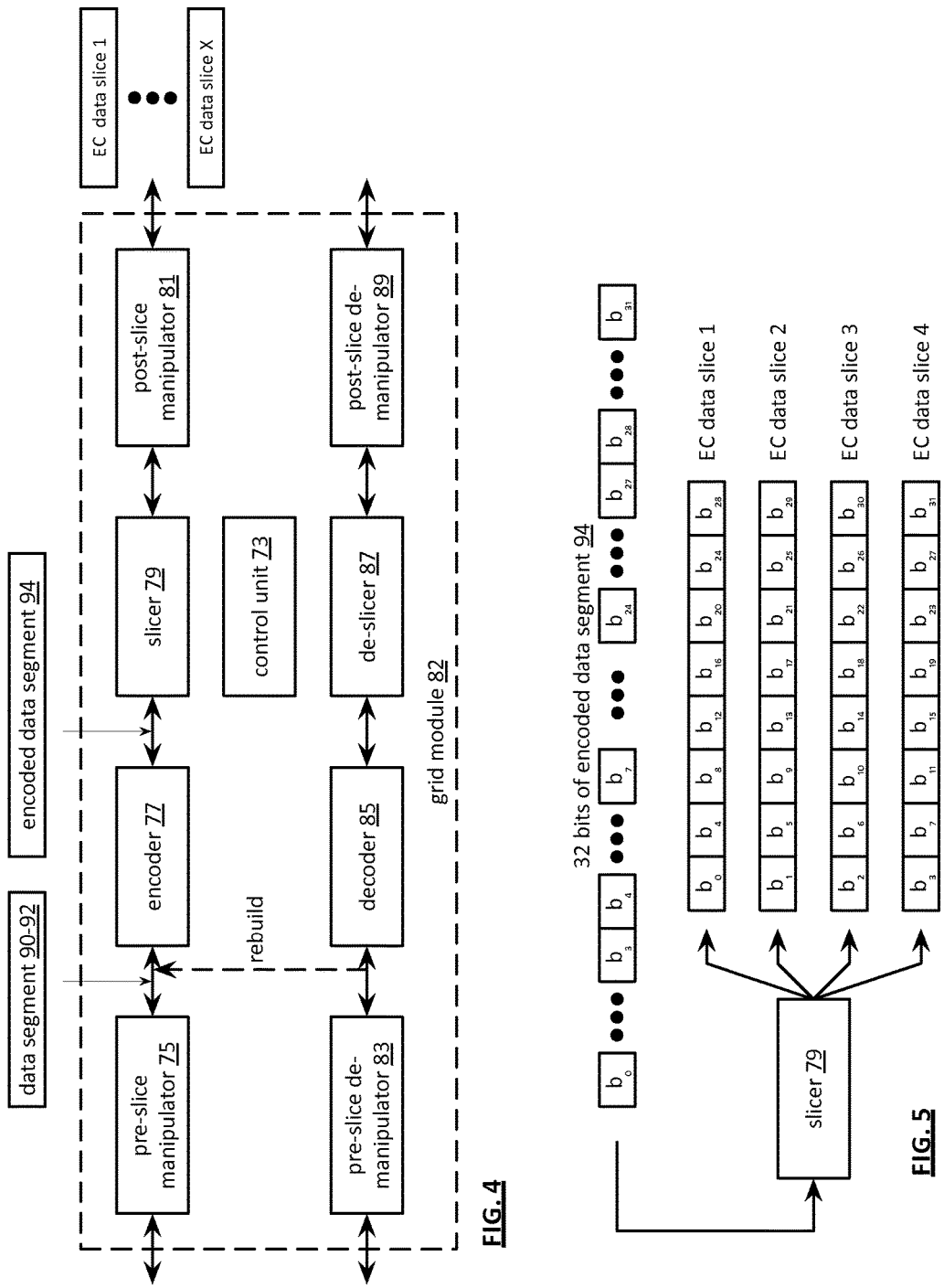
FIG. 4 is a schematic block diagram of an embodiment of a grid module in accordance with the present invention.
FIG. 5 is a diagram of an example embodiment of error coded data slice creation in accordance with the present invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
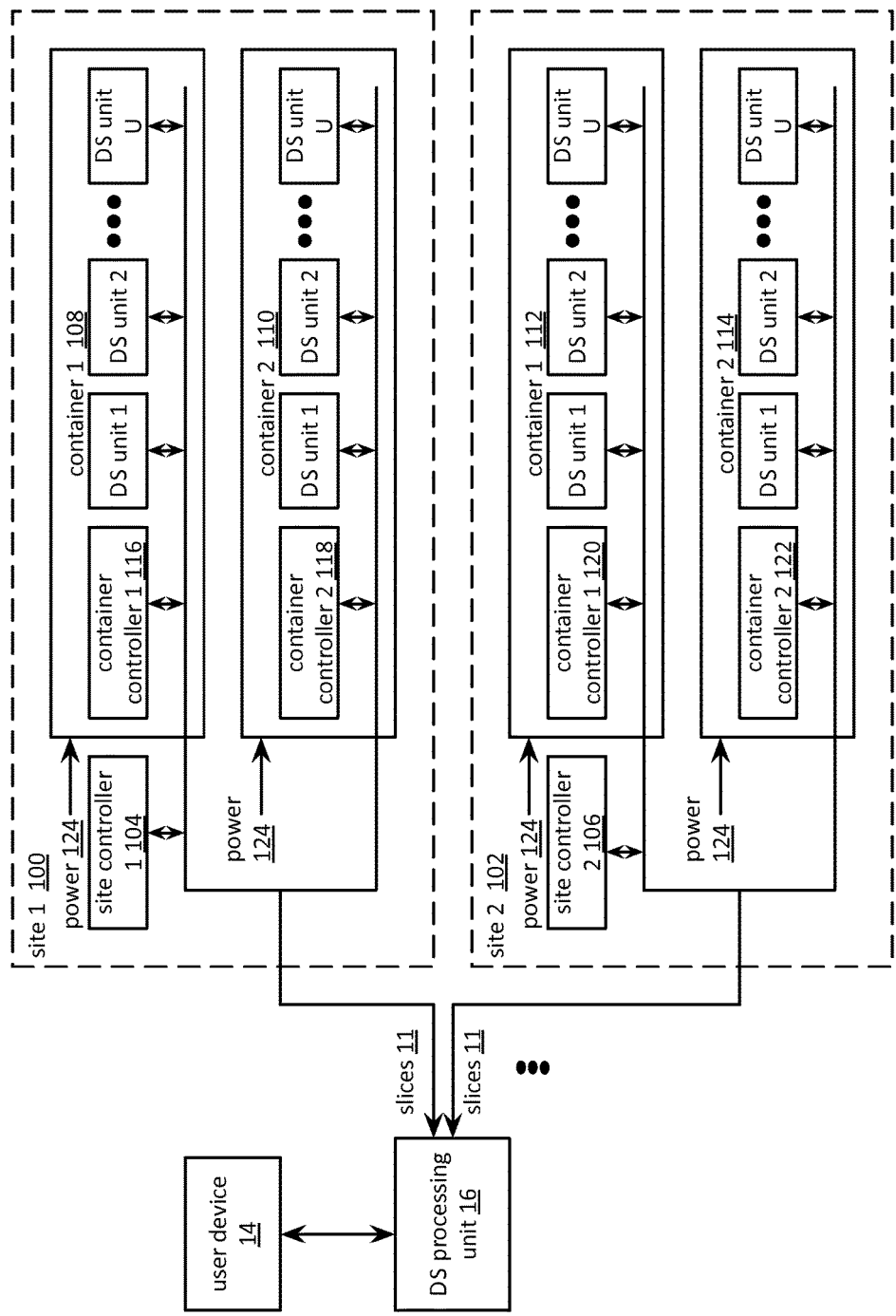
FIG. 6 is a schematic block diagram of another embodiment of a computing system in accordance with the present invention.

FIG. 6 is a schematic block diagram of another embodiment of a computing system. The system includes a user device 14, a dispersed storage (DS) processing unit 16, and a plurality of sites 100, 102. Each site of the plurality of sites 100, 102 may be located at different geographic locations providing geographic diversity. The sites provide a physical installation environment, required power, and network connectivity (e.g., wireline and/or wireless) to other sites of a dispersed storage network (DSN). Each site of the plurality of sites hosts one or more containers of a plurality of containers 108-114 and each site hosts at least one site controller of a plurality of site controllers 104-106. For each site, the at least one site controller may be implemented as a separate computing unit (e.g., a server) or as a function within one or more of the one or more containers.

Each container (e.g., a shipping container, a box, a sealed environment, a tanker, a thermal control pool) of the one or more containers includes one or more of network connectivity, one or more DS units 1-U, at least one container controller of a plurality of container controllers 116-122, environmental control (e.g., heating and cooling), and a power input 124. The at least one container controller may be implemented as a separate computing unit or as a function within the one or more DS units 1-U. For example, container 1 108 at site 1 100 includes a container controller 1 116 and DS units 1-U associated with container 1 108 and container 2 110 at site 1 100 includes a container controller 2 118 and DS units 1-U associated with container 2 110.

The at least one site controller assists in container operations associated with a common site. For example, site controller 1 104 receives an access request from DS processing unit 16 and facilitates access to the one or more containers 108-110 associated with site controller 1 104. As another example, site controller 1 104 facilitates migration of stored encoded data slices 11 from container 1 108 of site 1 100 to container 2 110 of site 1 100 based on migration criteria.

The at least one container controller assists in container operations associated with the at least one container controller. For example, container controller 2 122 of container 2 114 of site 2 102 receives an access request from DS processing unit 16 and facilitates access to the one or more DS units 1-U associated with the container controller 2 122. As another example, container controller 1 120 of container 1 112 of site 2 102 facilitates migration of stored encoded data slices 11 from DS unit 2 of container 1 112 of site 2 102 to DS unit 10 of container 1 112 of site 2 102 based on migration criteria.

In an example of storing data, encoded data slices 11 associated with each pillar of a pillar width number of a set of encoded data slices are stored within a common container. For instance, the DS processing unit 16 dispersed storage error encodes data to produce a plurality of sets of encoded data slices 11, wherein each set of the plurality of sets of encoded data slices includes four pillars of encoded data slices when a pillar width is four. Next, the DS processing unit 16 facilitate storage of each set of four encoded data slices of the plurality of sets of encoded data slices 11 in DS units 1-4 of container 1 108 at site 1 100. In an example of retrieving the data, the DS processing unit 16 facilitates retrieval of at least three encoded data slices 11 from DS units 1-4 of container 1 108 at site 1 100 when a decode threshold is three. In an example of rebuilding an encoded data slice of a set of the plurality of sets of encoded data slices, container controller 1 116 at site 1 100 retrieves at least three encoded data slices 11 from DS units 1-4 of container 1 108 at site 1 100 and dispersed storage error decodes the at least three encoded data slices to reproduce a data segment associated with an encoded data slice to be rebuilt. Next, the container controller 1 116 at site 1 100 dispersed storage error encodes the data segment to reproduce the data slice to be rebuilt.

In another example storing data, encoded data slices associated with each pillar of the pillar with number of the set of encode slices are stored within two or more containers of a common site. For instance, a DS processing unit 16 facilitates storage of two encoded data slices of each set of four encoded data slices of the plurality of sets of encoded data slices 11 in DS units 1-2 of container 1 112 at site 2 102 and facilitates storage of a remaining two encoded data slices of each set of four encoded data slices of the plurality of sets of encoded data slices in DS units 1-2 of container 2 114 at site 2 102.

In an example of retrieving the data, the DS processing unit 16 facilitates retrieval of at least three encoded data slices 11 from DS units 1-2 of container 1 112 at site 2 102 and DS units 1-2 of container 2 114 at site 2 102. In an example of rebuilding an encoded data slice of a set of the plurality of sets of encoded data slices 11, site controller 2 106 at site 2 102 retrieves at least three encoded data slices 11 from DS units 1-2 of container 1 112 at site 2 102 and DS units 1-2 of container 2 114 at site 2 102 and dispersed storage error decodes the at least three encoded data slices to reproduce a data segment associated with an encoded data slice to be rebuilt. Next, the site controller 2 106 at site 2 102 dispersed storage error encodes the data segment to reproduce the data slice to be rebuilt.

Figure 7A:
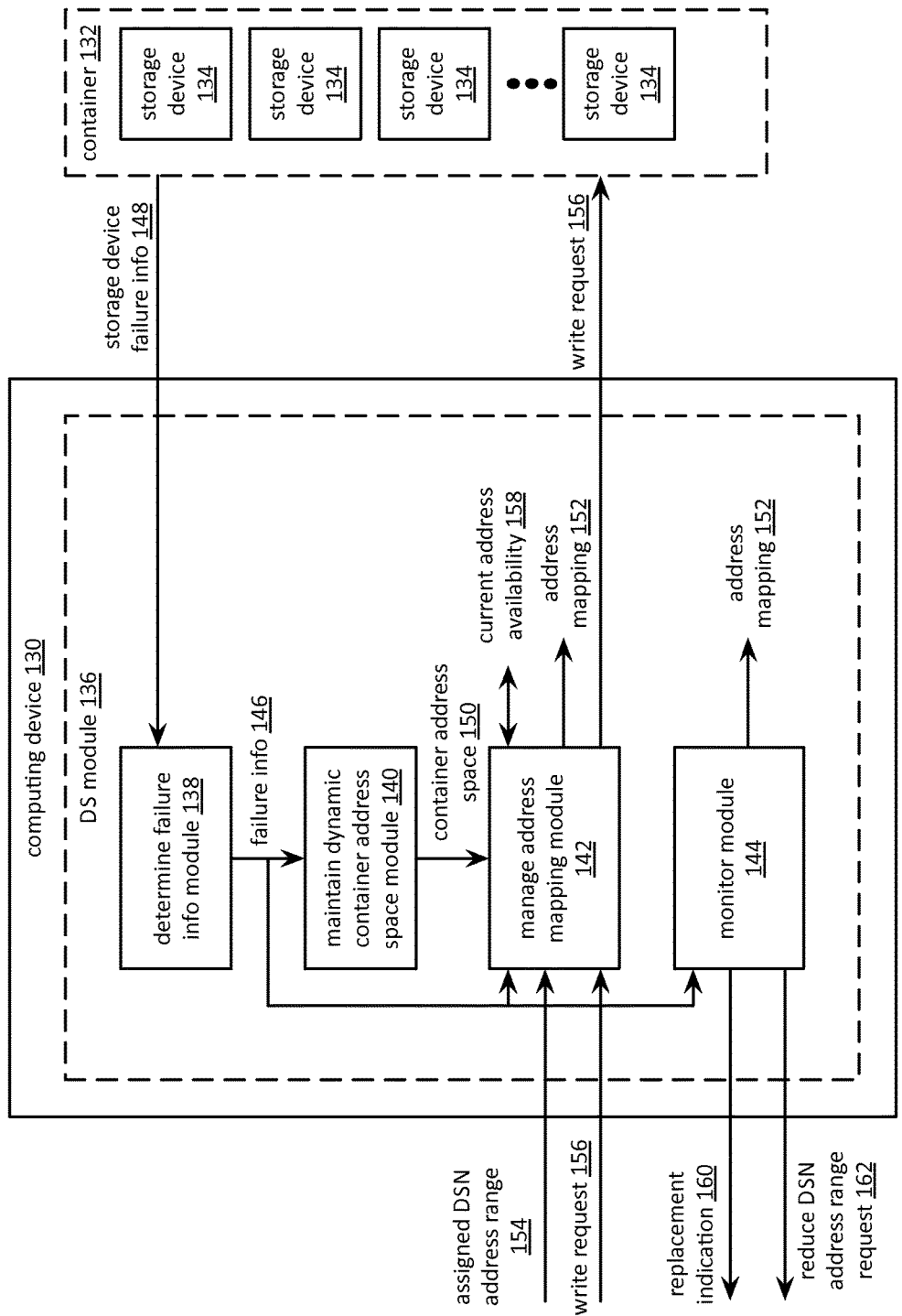
FIG. 7A is a schematic block diagram of another embodiment of a computing system in accordance with the present invention.

FIG. 7A is a schematic block diagram of another embodiment of a computing system that includes a computing device 130 and a maintenance free storage container 132. The maintenance free storage container 132 includes a plurality of storage devices 134. A storage device may include at last one of a memory device, a plurality of memory devices, and a plurality of dispersed storage (DS) units 36. The computing device 130 may be implemented as at least one of a site controller, a container controller, a user device, a DS processing unit, a DS unit, a DS managing unit, and any other computing device operable to couple with the maintenance free storage container 132. The computing device 130 includes a DS module 136. The DS module 136 includes a determine failure information module 138, a maintain dynamic container address space module 140, a manage address mapping module 142, and a monitor module 144.

The determine failure information module 138, when operable within the computing device 130, causes the computing device 130 to determine storage device failure information 146 for a plurality of storage devices 134 within the maintenance free storage container 132, wherein the maintenance free storage container 132 allows for multiple storage devices 134 of the plurality of storage devices 134 to be in a failure mode without replacement and wherein the storage device failure information 146 indicates storage devices 134 of the plurality of storage devices 134 that are in the failure mode. The determine failure information module 138 functions to determine the storage device failure information 146 by determining that one or more storage locations within a first storage device of the plurality of storage devices has failed, determining that a second storage device of the plurality of storage devices has failed, and determining that a third storage device of the plurality of storage devices is operating at less than a desired storage level but greater than a storage failure level. The determine failure information module 138, when operable within the computing device 130, further causes the computing device 130 to obtain local storage device failure information 148 from a plurality of dispersed storage (DS) units within the maintenance free storage container 132, wherein a DS unit of the plurality of DS units includes a set of storage devices 134 of the plurality of storage devices 134 and compile the location storage device failure information 148 to determine the storage device failure information 146.

The maintain dynamic container address space module 140, when operable within the computing device 130, causes the computing device 130 to maintain a dynamic container address space 150 of the maintenance free storage container 132 based on the storage device failure information 146. The dynamic container address space 150 includes at least one of a storage device (ID), a DS unit ID, a storage device internet protocol (IP) address, a DS unit IP address, and a storage device physical location designator. The maintain dynamic container address space module 140 functions to maintain the dynamic container address space 150 by identifying one or more storage locations within a first storage device of the plurality of storage devices 134 is in the storage device failure information 146 as failed and removing one or more addresses associated with the one or more storage locations from the dynamic container address space 150 and identifying a second storage device of the plurality of storage devices is in the storage device failure information 146 as failed and removing addresses associated with the second storage device from the dynamic container address space 150. Next, the maintain dynamic container address space module 140 identifies a third storage device of the plurality of storage devices is in the storage device failure information 146 as being at less than a desired storage level, removes one or more addresses associated with failed storage locations of the third storage device from the dynamic container address space 150, and flags remaining addresses of the third storage device in the dynamic container address space 150 as being of reduced reliability.

The manage address mapping module 142, when operable within the computing device 130, causes the computing device 130 to manage mapping 152 of container addresses of the dynamic container address space 150 to dispersed storage network (DSN) addresses of an assigned DSN address range 154. The assigned DSN address range 154 may include one or more of a site ID, a container ID, a storage device ID, a slice name range, a start DSN address, an end DSN address, a start slice name, and an end slice name. The assigned DSN address range 154 may be received from at least one of a DS managing unit and a DS processing unit. The manage address mapping module 142 functions to manage mapping container addresses of the dynamic container address space 150 to DSN addresses by, when a write request 156 to an address within the assigned address range is received, determining a container address within the dynamic container address space 150 based on the storage device failure information 146 and address availability 158 within the dynamic container address space 150, facilitating the write request 156 to the container address, and updating the current address availability 158 within the dynamic container address space 150.

The updating the current address availability 158 includes indicating that the container address is mapped to the address within the assigned DSN address range 154. The determining the container address includes selecting a storage address associated with a storage device with a desired level of reliability as indicated by the storage device failure information 146. The selecting may also include selecting a container address that is associated with storage with a common pillar of DSN addresses (e.g., select a storage device that is already storing slices of the same pillar). Selecting may also include selecting a container address that is associated with favorable storage device failure information 146 when each address of the dynamic container address space 150 is not associated with a pillar number of the DSN address. Selecting may also include selecting a container address that is associated with a DSN address that is adjacent to the DSN address.

The manage address mapping module 142 further functions to manage mapping container addresses of the dynamic container address space to DSN addresses by determining, based on the storage device failure information 146, whether a stored encoded data slice is to be rebuilt or is to be moved to a different container address. For example, the manage address mapping module 142 determines that the stored encoded data slice is to be rebuilt when at least one of the slice is stored in a failed storage location in the slice is stored in a failed storage device. As another example, the manage address mapping module 142 determines that the stored encoded data slice is to be moved when the stored encoded data slice is stored in a storage device associated with a reliability level below a reliability threshold based on the storage device failure information.

When the stored encoded data slice is to be rebuilt, the manage address mapping module 142 rebuilds the stored encoded data slice in accordance with a dispersed storage error coding function to produce a rebuilt encoded data slice and determines a new container address within the dynamic container address space 150 based on the storage device failure information 146 and current address availability 158 within the dynamic container address space 150. The rebuilding includes obtaining a decode threshold number of encoded data slices associated with a common data segment of the stored encoded data slice, decoding the decode threshold number of encoded data slices to reproduce the common data segment, and encoding the common data segment to produce the rebuilt encoded data slice. Next, the manage address mapping module 142 facilitates writing the rebuilt encoded data slice to the new container address, updating the mapping 152 of container addresses to the DSN addresses with the new container address, and updating the current address availability 158 within the dynamic container address space 150.

When the stored encoded data slice is to be moved, the manage address mapping module 142 determines a new container address within the dynamic container address space 150 based on the storage device failure information 146 and current address availability 158 within the dynamic container address space 150 and facilitates writing the encoded data slice to the new container address. Next, the manage address mapping module 142 updates the mapping of container addresses to the DSN addresses with the new container address and updates the current address availability 158 within the dynamic container address space 150.

The monitor module 144, when operable within the computing device 130, causes the computing device 130 to monitor the storage device failure information 146 and when the storage device failure information 146 is at a container level threshold, generate an indication 160 that the maintenance free storage container 132 is in need of replacement. The monitor module 144, when operable within the computing device 130, further causes the computing device 130 to monitor the storage device failure information 146 and when the storage device failure information 146 is at a container level threshold, generate a request 162 to reduce the assigned DSN address range. When the request to reduce the assigned DSN address range is granted (e.g., the manage address mapping module 142 and/or the monitor module 144 receives an updated assigned DSN address range), the monitor module 144 facilitates writing a selected group of encoded data slices (e.g., corresponding to a reduced portion of the assigned DSN address range) to another maintenance free storage container and adjusts the mapping 152 of the container addresses of the dynamic container address space 150 to the DSN addresses of a reduced DSN address range (e.g., excluding the reduced portion of the assigned DSN address range).

Figure 7B:
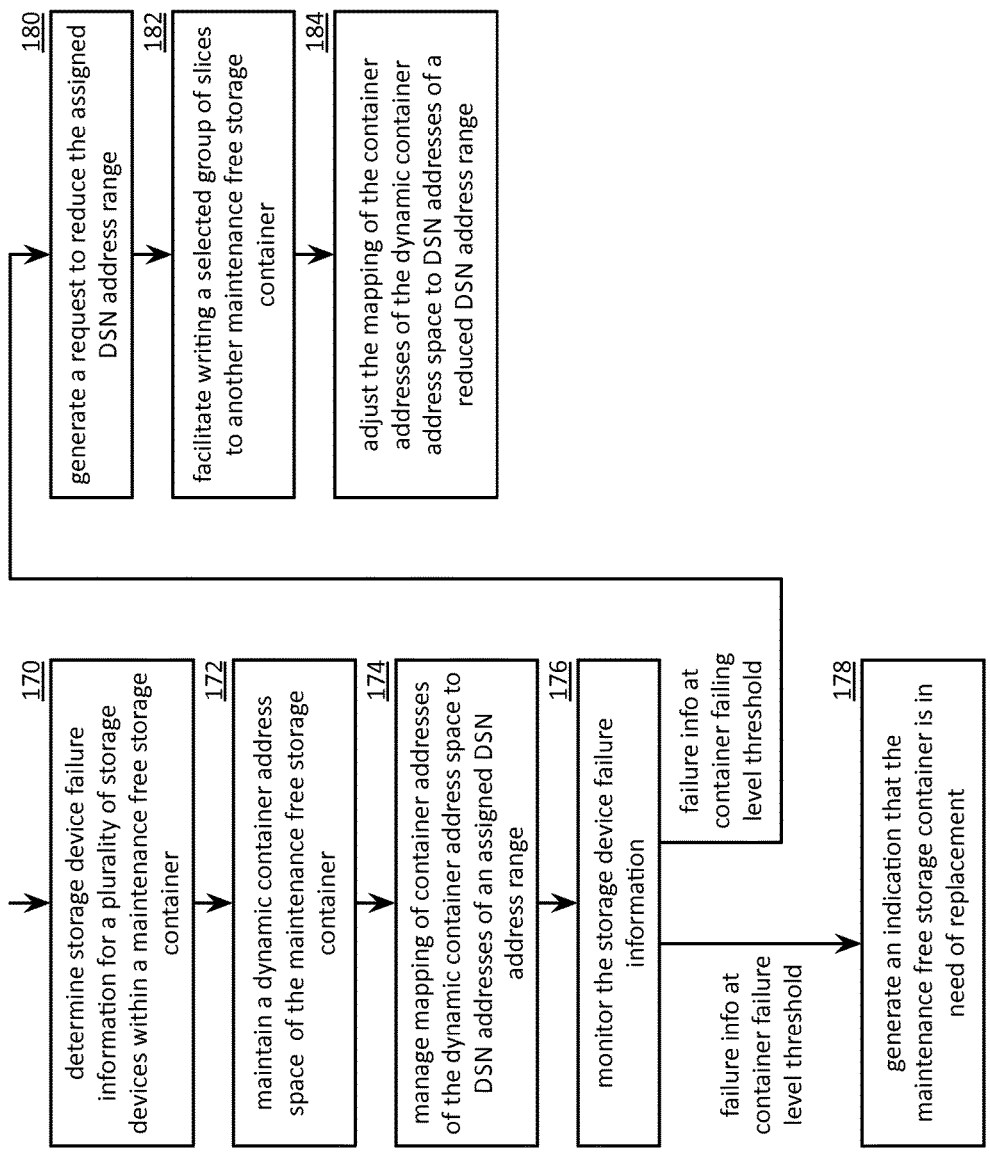
FIG. 7B is a flowchart illustrating an example of assigning a dispersed storage network (DSN) address range in accordance with the present invention.

FIG. 7B is a flowchart illustrating an example of assigning a dispersed storage network (DSN) address range. The method begins at step 170 where a processing module (e.g., of a site controller, a container controller, a storage device, a dispersed storage (DS) processing unit, a DS unit) determines storage device failure information for a plurality of storage devices within a maintenance free storage container, wherein the maintenance free storage container allows for multiple storage devices of the plurality of storage devices to be in a failure mode without replacement and wherein the storage device failure information indicates storage devices of the plurality of storage devices that are in the failure mode. The determining the storage device failure information includes determining that one or more storage locations within a first storage device of the plurality of storage devices has failed, determining that a second storage device of the plurality of storage devices has failed, and determining that a third storage device of the plurality of storage devices is operating at less than a desired storage level but greater than a storage failure level. The determining storage device failure information includes obtaining local storage device failure information from a plurality of DS units within the maintenance free storage container, wherein a DS unit of the plurality of DS units includes a set of storage devices of the plurality of storage devices and compiling the location storage device failure information to determine the storage device failure information.

The method continues at step 172 where the processing module maintains a dynamic container address space of the maintenance free storage container based on the storage device failure information. The maintaining the dynamic container address space includes identifying one or more storage locations within a first storage device of the plurality of storage devices is in the storage device failure information as failed and removing one or more addresses associated with the one or more storage locations from the dynamic container address space and identifying a second storage device of the plurality of storage devices is in the storage device failure information as failed and removing addresses associated with the second storage device from the dynamic container address space. The maintaining the dynamic container address space further includes identifying a third storage device of the plurality of storage devices is in the storage device failure information as being at less than a desired storage level, removing one or more addresses associated with failed storage locations of the third storage device from the dynamic container address space, and flagging remaining addresses of the third storage device in the dynamic container address space as being of reduced reliability.

The method continues at step 174 where the processing module manages mapping of container addresses of the dynamic container address space to dispersed storage network (DSN) addresses of an assigned DSN address range. The managing mapping container addresses of the dynamic container address space to DSN addresses includes, when a write request to an address within the assigned address range is received, determining a container address within the dynamic container address space based on the storage device failure information and current address availability within the dynamic container address space, facilitating the write request to the container address, and updating the current address availability within the dynamic container address space. Selecting may also include selecting a container address that is associated with storage with a common pillar of DSN addresses (e.g., select a storage device that is already storing slices of the same pillar). Selecting may also include selecting a container address that is associated with favorable storage device failure information when each address of the dynamic container address space is not associated with a pillar number of the DSN address. Selecting may also include selecting a container address that is associated with a DSN address that is adjacent to the DSN address.

The managing mapping container addresses of the dynamic container address space to DSN addresses further includes determining, based on the storage device failure information, whether a stored encoded data slice is to be rebuilt or is to be moved to a different container address. When the stored encoded data slice is to be rebuilt, continuing at step 174, the processing module rebuilds the stored encoded data slice in accordance with a dispersed storage error coding function to produce a rebuilt encoded data slice and determines a new container address within the dynamic container address space based on the storage device failure information and current address availability within the dynamic container address space. Next, the processing module facilitates writing the rebuilt encoded data slice to the new container address, updates the mapping of container addresses to the DSN addresses with the new container address, and updates the current address availability within the dynamic container address space.

When the stored encoded data slice is to be moved, continuing at step 174, the processing module determines a new container address within the dynamic container address space based on the storage device failure information and current address availability within the dynamic container address space. Next, the processing module facilitates writing the encoded data slice to the new container address, updates the mapping of container addresses to the DSN addresses with the new container address, and updates the current address availability within the dynamic container address space.

The method continues at step 176 where the processing module monitors the storage device failure information. The monitoring includes comparing the storage device failure information to one or more container level thresholds. The one or more container level thresholds includes at least one of a failure threshold and a failing threshold. The failure threshold indicates that the maintenance free storage container has reached an end-of-life due to failure. The failing threshold indicates that at least a portion of the plurality of storage devices of the maintenance free storage container have failed and that the remaining portion of the plurality of storage devices of the maintenance free storage container are operational. When the storage device failure information is at the container level failure threshold, the method continues at step 178 where the processing module generates an indication that the maintenance free storage container is in need of replacement. For example, the processing module generates the indication and outputs the indication to a DS managing unit.

When the storage device failure information is at the container failing level threshold, the method continues at step 180 where the processing module generates a request to reduce the assigned DSN address range. The generating includes one or more of generating the request, outputting the request (e.g., to a DS processing unit), and receiving a response. When the request to reduce the assigned DSN address range is granted, the method continues at step 182 where the processing module facilitates writing a selected group of encoded data slices to another maintenance free storage container. The facilitating includes one or more of selecting the selected group of encoded data slices (e.g., corresponding to storage devices associated with unfavorable storage device failure information), retrieving the selected group of encoded data slices from storage devices of the maintenance free storage container, selecting the other maintenance free storage container (e.g., associated with favorable other storage device failure information), and outputting the retrieved selected group of encoded data slices to the selected other magnets free storage container. The method continues at step 184 where the processing module adjusts the mapping of the container addresses of the dynamic container address space to DSN addresses of a reduced DSN address range. For example, the processing module identifies DSN addresses excluded from the DSN address range based on the reduced DSN address range and eliminates the corresponding mapping for the excluded DSN addresses.

Figure 8A:
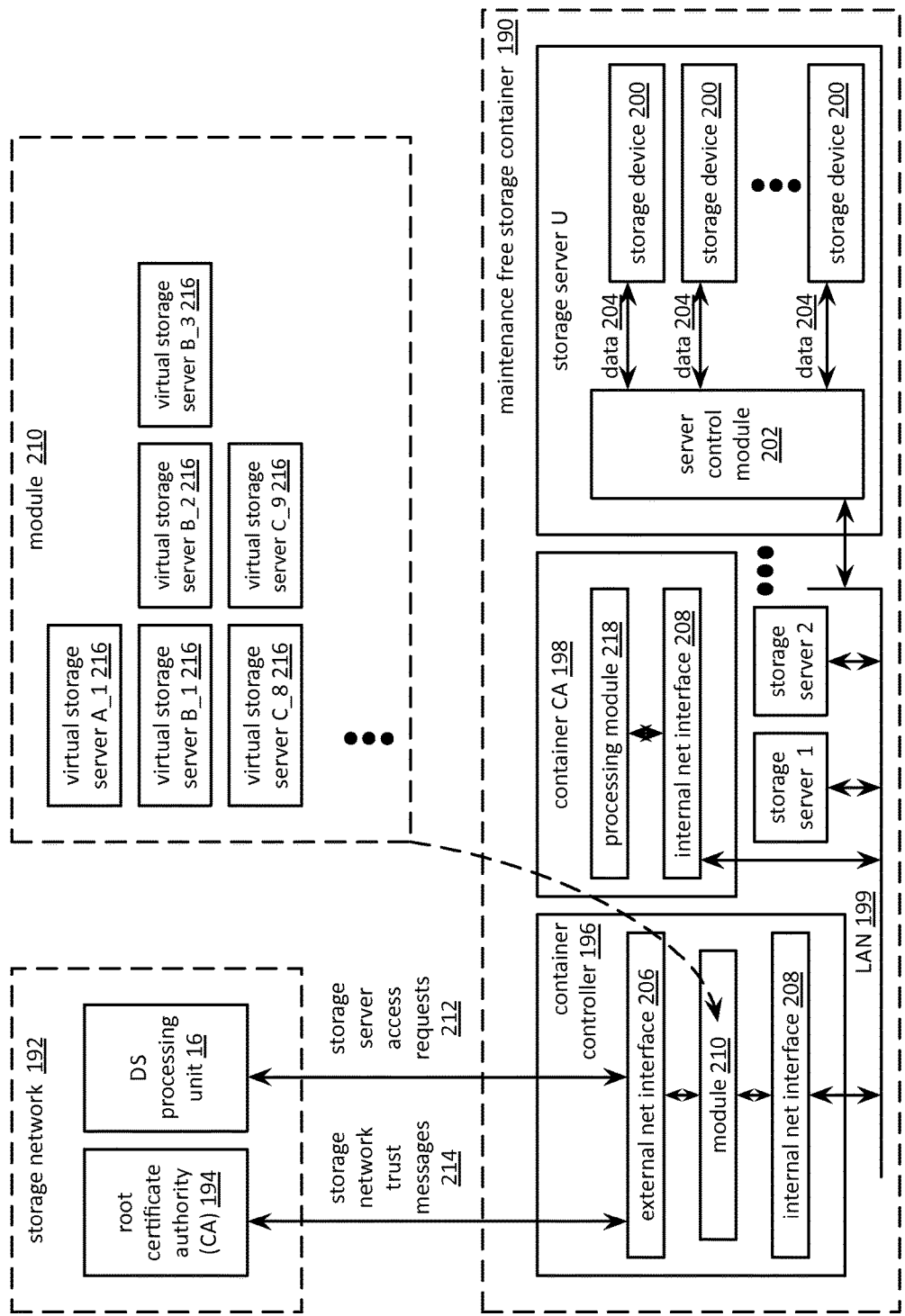
FIG. 8A is a schematic block diagram of another embodiment of a computing system in accordance with the present invention.

FIG. 8A is a schematic block diagram of another embodiment of a computing system that includes a storage network 192 and at least one maintenance free storage container 190. The storage network 192 includes one or more of a dispersed storage (DS) processing unit 16, a root certificate authority (CA) 194, a client, a user device, and a DS managing unit. The maintenance free storage container 190 includes a plurality of storage servers 1-U, a container controller 196, a container CA 198, and a local area network (LAN) 199. Alternatively, two or more maintenance free storage containers 190 share a common container controller 196 and/or a common container CA 198. The container CA 198 includes an internal network interface 208 and a processing module operable 218.

Each storage server of the plurality storage servers 1-U includes a plurality of storage devices 200 and a server control module 202, wherein the server control module 202 manages storage and retrieval of data 204 from the plurality of storage devices 200, and wherein the maintenance free storage container 190 allows for multiple storage servers of the plurality of storage servers 1-U to be in a failure mode without replacement and allows for multiple storage devices 200 of the plurality of storage devices 200 of one or more the plurality of storage servers 1-U to be in the failure mode without replacement. Each storage device 200 includes one or more memory devices (e.g., a magnetic disk drive, an optical disk drive, solid-state memory, etc.).

The container controller 196 includes an external network interface 206, the internal network interface 208, and a module 210. The module 210 includes a plurality of virtual storage servers 216. Each virtual storage server of the plurality of virtual storage servers 216 includes hardware and/or software of module 210 to provide a storage server with respect to the storage network 192, wherein the storage network 192 addresses each virtual storage server utilizing one or more dispersed storage network (DSN) addresses. The DSN address includes a vault identifier and a pillar identifier, wherein the vault identifier identifies a virtual storage vault of a DSN and the pillar identifier identifies a specific pillar coded value of data encoded using a dispersed storage error coding function. For example, virtual storage server A_1 corresponds to vault A and pillar 1 and virtual storage server B_2 corresponds to vault B and pillar 2. Each virtual vault of the DSN includes a pillar width number of pillars, wherein the pillar width corresponds to the vault. For example, vault A includes a pillar width of 16 and vault B includes a pillar width of 8.

A number of virtual storage servers per vault are assigned to the module 210 in accordance with a storage network storage scheme. For example, a first 3 pillars of vault B are to be stored in virtual storage servers B_1, B_2, and B_3 of a first container controller 196 of a first maintenance free storage container 190 and a remaining 5 pillars of vault B are to be stored in virtual storage servers of a second container controller 196 of a second maintenance free storage container 190 when the storage network storage scheme includes associating at least a decode threshold number of pillars with each maintenance free storage container 190 of at least two maintenance free storage containers 190 and the decode threshold is 3 and the pillar width is 8.

The container controller 196 is operable to manage failure mode information (e.g., a performance level, a reliability level, an availability level) of the plurality of storage servers 1-U, manage mapping of the plurality of virtual storage servers 216 to at least some of the plurality of storage servers 1-U based on the failure mode information. The container controller 196 is further operable to communicate, via the external network interface 206, storage server access requests 212 with a device (e.g., the DS processing unit 16) external to the maintenance free storage container 190 using addressing of the plurality of virtual storage servers 216. The container controller 196 is further operable to communicate, via the internal network interface 208, the storage server access requests 212 within the maintenance free storage container 190 using addressing of the plurality of storage servers 1-U (e.g., an Internet protocol address of a storage server).

The container controller 196 is further operable to facilitate authentication of the plurality of virtual storage servers 216 with the storage network root certificate authority 194 utilizing storage network trust messages 214 via the external network interface 206. The container CA 198 is operable to authenticate, via the internal network interface 208, the plurality of storage servers 1-U to produce a plurality of storage server container certificates that are an indication of trust within the maintenance free storage container 190. The container CA 198 is further operable to authenticate, via the internal network interface 208, the plurality of virtual storage servers 216 to produce a plurality of virtual storage server container certificates that are an indication of trust within the maintenance free storage container 190. Authentication of the plurality of virtual storage servers 216 and authentication of the plurality of storage servers 1-U is discussed in greater detail with reference to FIG. 8B.

The managing of the mapping of the plurality of virtual storage servers 216 to the at least some of the plurality of storage servers 1-U further includes accessing a trust table that includes a plurality of entries corresponding to the plurality of storage servers 1-U, wherein an entry of the plurality of entries includes an indication as to whether a storage server of the plurality of storage servers 1-U in a trusted state, a temporary untrusted state, or a permanent untrusted state. The container controller 196 is further operable to update the trust table by determining that the storage server is in the temporary untrusted state when the storage server is currently unavailable (e.g., no response) and the entry does not indicate that the storage server is in the permanent untrusted state and determining that the storage server is in the permanent untrusted state when the storage server has failed (e.g., permanently auto service, a failure rate compares unfavorably to a failure threshold) or has been compromised (e.g., at least one storage server access requests results in data that fails an integrity test).

The container controller 196 is further operable to receive, via the external network interface 206, a storage server access request of the storage server access requests 212, wherein the storage server access request includes a virtual storage server address of a virtual storage server of the plurality of virtual storage servers 216 and a root certificate (e.g., a signed certificate by the root CA 194). The container controller 196 is further operable to process the storage server access request by determining whether the root certificate is valid (e.g., validation is favorable of the root certificate including use of a public key associated with the root CA 194), and when the root certificate is valid, identifying a storage server of the plurality of storage servers 1-U based on the mapping of the plurality of virtual storage servers to the at least some of the plurality of storage servers 1-U. Next, the container controller 196 is further operable to determine trust status of the identified storage server. The determining trust status may include one or more of receiving a signed certificate from the identified storage server, initiating a re-authentication (e.g., invoking the identified storage server to issue a certificate signing request), and accessing the trust table. When the trust status is a permanent untrusted state, the container controller 196 is further operable to flag the virtual storage server for remapping to a trusted storage server of the plurality of storage servers 1-U.

When the trust status is a temporary untrusted state, the container controller 196 is further operable to respond to the storage server access request as if the storage server is currently unavailable. The responding includes at least one of re-triggering an authentication sequence, ignoring the storage server access request, and sending a not available message.

When the trust status is a temporary untrusted state, the container controller 196 is further operable to convert an address of the storage server access request from the addressing of the plurality of virtual storage servers to the addressing of the plurality of storage servers to produce a container storage server address and send the converted storage server access request to the identified storage server using the container storage server address. The identified storage server converts (e.g. a table lookup) the container storage server address into a physical address (e.g., memory device identifier, memory offset, memory block number) of one or more of the plurality of storage devices within the identified storage server.

The container controller 196 is further operable to manage mapping of the plurality of virtual storage servers 216 to at least some of the plurality of storage servers by 1-U interpreting the failure mode information to identify a failed storage server of the plurality of storage servers 1-U, utilizing a dispersed storage error coding function to rebuild data stored in the failed storage server to produce rebuilt data, and storing the rebuilt data in another storage server of the plurality of storage servers 1-U. The rebuilding includes retrieving one or more sets of at least a decode threshold number of encoded data slices of one or more common data segments corresponding to data to be rebuilt, decoding the one or more sets of the at least the decode threshold number of encoded data slices utilizing the dispersed storage error coding function to produce one or more reproduced common data segments, and encoding the one or more reproduced common data segments utilizing the dispersed storage error coding function to produce the rebuilt data. Alternatively, the container controller 196 is further operable to send a rebuild data request that includes identity of the data to be rebuilt to at least one of another container controller 196, a storage server, the DS processing unit 16, and a storage network 192.

The container controller 196 is further operable to manage mapping of the plurality of virtual storage servers to at least some of the plurality of storage servers by interpreting the failure mode information to identify a failed storage device of a storage server of the plurality of storage servers, utilizing a dispersed storage error coding function to rebuild data stored in the failed storage device to produce rebuilt data, and storing the rebuilt data in another storage device in the storage server or in another storage server of the plurality of storage servers 216.

Figure 8B:
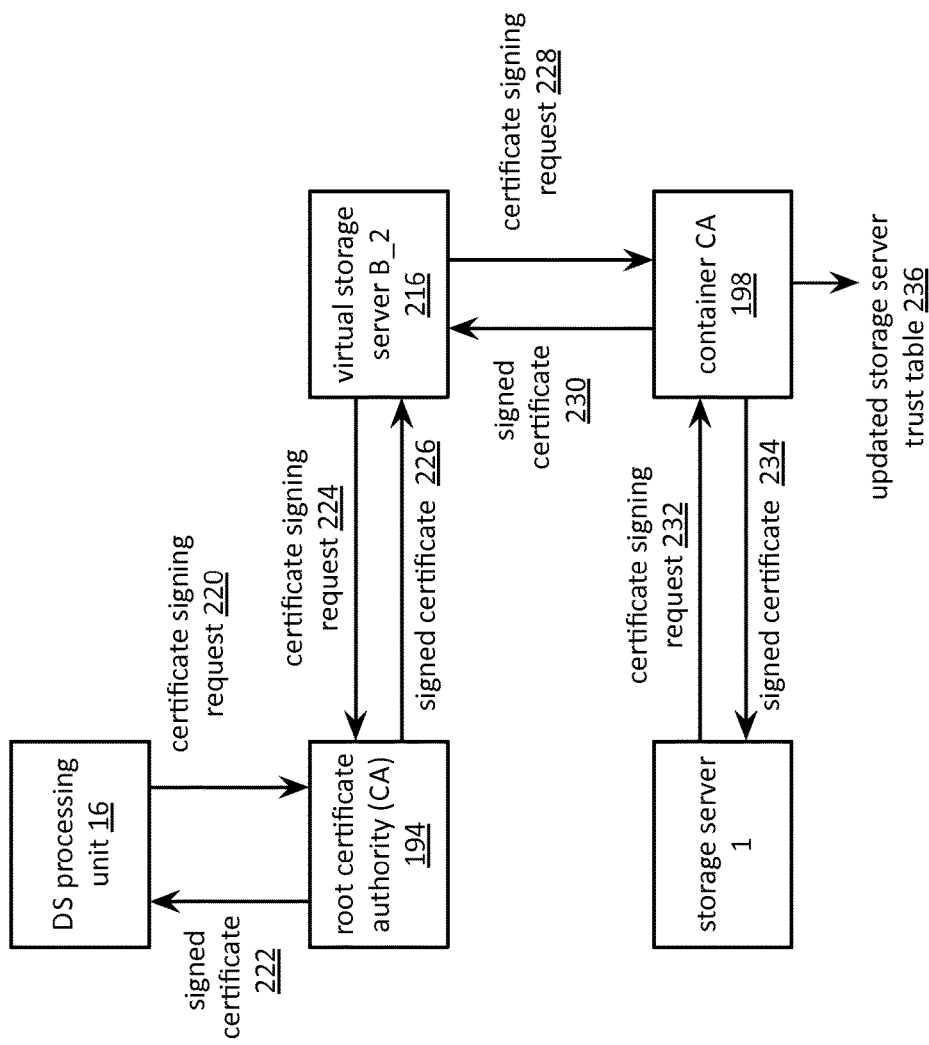
FIG. 8B is a schematic block diagram of an embodiment of an authentication system in accordance with the present invention.

FIG. 8B is a schematic block diagram of an embodiment of an authentication system that includes a dispersed storage (DS) processing unit 16, a root certificate authority (CA) 194, a virtual storage server B_2 216 (e.g., associated with a vault B and a pillar 2), a container CA 198, and a storage server 1. The authentication system is operable to authenticate the DS processing unit 16 and the virtual storage server B_2 216 with the root certificate authority 194, to authenticate the virtual storage server B_2 216 and the storage server 1 with the container certificate authority 198, and to generate an updated storage server trust table 236. Authentication includes a requesting entity generating a certificate signing request, the requesting entity sending the certificate signing request to a corresponding certificate authority, the corresponding certificate authority validating the certificate signing request, the corresponding certificate authority generating a signed certificate, the corresponding certificate authority sending the signed certificate to the requesting entity, the requesting entity receiving the signed certificate, and the requesting entity saving the signed certificate for subsequent utilization.

The certificate signing request includes one or more of a requesting entity universally unique identifier (UUID), a requesting entity public key, a requesting entity authorization code, and a signature over at least a portion of the certificate signing request generated by the requesting entity utilizing a requesting entity private key. The signature may include utilization of a signature algorithm and encrypting a hash digest of the least the portion of the certificate signing request, wherein the encrypting utilizes the requesting entity private key. The requesting entity private key may be generated by the requesting entity based on a random number. The requesting entity public key may be generated based on the requesting entity private key and in accordance a public key infrastructure (PKI) function.

The validating of the certificate signing request includes one or more of determining whether a received authentication code and received UUID compare favorably to a list of authorized pairs of authentication codes and UUIDs and determining whether the signature of the requesting entity is valid. The corresponding certificate authority indicates that the certificate signing request is not valid when the received authentication code and received UUID do not match an authorized pair of authentication codes and UUIDs. The determining whether the signature of the requesting entity is valid includes at least one of utilizing a validation algorithm associated with a signature type and determining whether a calculated hash digest of the at least the portion of the received certificate signing request compares favorably to a decrypted signature utilizing the requesting entity public key. The corresponding certificate authority indicates that the certificate signing request is not valid when the calculated hash digest of the at least the portion of the received certificate signing request is not substantially the same as the decrypted signature. The corresponding certificate authority indicates that the certificate signing request is valid when the corresponding certificate authority does not indicate that the certificate signing request is invalid. The corresponding certificate authority saves one or more of the UUID other requesting entity and the public key of the requesting entity.

The corresponding certificate authority generates the signed certificate to include a corresponding certificate authority public key, a certificate timeout indicator, and a signed certificate signature. The generating of the signed certificate signature includes generating the signed certificate signature, utilizing a corresponding certificate authority private key, over one or more of at least a portion of the certificate signing request and an ordered certificate chain that includes one or more other signed certificates (e.g., order from the corresponding certificate authority up to an associated highest order certificate authority if any). The signature generation may include one or more of utilizing a signature algorithm and encrypting a hash digest of the least the portion of an item to be signed, wherein the encrypting utilizes the corresponding certificate authority private key. The corresponding certificate authority private key may be generated by the corresponding certificate authority based on a random number. The corresponding certificate authority public key may be generated based on the corresponding certificate authority private key and in accordance the PKI function.

The requesting entity may initiate authentication with the corresponding certificate authority based on at least one of detecting new installation, detecting a reset, receiving an error message, receiving a request to re-authenticate, and detecting a previous signed certificate timeout. Initiating authentication includes generating the certificate signing request and sending the certificate signing request to the corresponding certificate authority. The corresponding certificate authority completes authentication by validating the certificate signing request, generating a signed certificate, and sending the signed certificate to the requesting entity.

In an example of authentication, DS processing unit 16 generates certificate signing request 220 to include one or more of a UUID associated with DS processing unit 16, an authentication code associated with DS processing unit 16, a public key associated with DS processing unit 16, and a signature over at least a portion of the certificate signing request 220 (e.g., utilizing a private key of the DS processing unit 16). Next, DS processing unit 16 sends the certificate signing request 220 to the root certificate authority 194. The root certificate authority 194 validates certificate signing request 220. When the certificate signing request 220 is valid, the root certificate authority 194 generates a signed certificate 222 to include one or more of a public key of root certificate authority 194, a certificate timeout indicator (e.g., 1 day), and a signed certificate signature over at least a portion of the signed certificate 222 (e.g., utilizing a private key of the root certificate authority 194). The DS processing unit 16 saves the signed certificate 222 and utilizes the signed certificate 222 in at least one subsequent access request with at least one other entity associated with the root certificate authority 194 (e.g., virtual storage server B_2 216 of a plurality of virtual storage servers).

In another example of authentication, virtual storage server B_2 216 generates certificate signing request 224 to include one or more of a UUID associated with virtual storage server B_2 216, an authentication code associated with virtual storage server B_2 216, a public key associated with virtual storage server B_2 216, and a signature over at least a portion of the certificate signing request 224 (e.g., utilizing a private key of the virtual storage server B_2 216). Each virtual storage server 216 of the plurality of virtual storage servers 216 may be associated with a unique UUID and a unique authentication code even when two or more virtual storage servers 216 of the plurality of virtual storage servers 216 may be implemented with a common computing device. Next, virtual storage server B_2 216 sends the certificate signing request 224 to the root certificate authority 194. The root certificate authority 194 validates certificate signing request 224. When the certificate signing request 224 is valid, the root certificate authority 194 generates a signed certificate 226 to include one or more of a public key of root certificate authority 194, a certificate timeout indicator (e.g., 1 day), and a signed certificate signature over at least a portion of the signed certificate 226 (e.g., utilizing a private key of the root certificate authority 194). The virtual storage server B_2 216 saves the signed certificate 226 and utilizes the signed certificate 226 in at least one subsequent access request with at least one other entity associated with the root certificate authority 194 (e.g., DS processing unit 16).

In yet another example of authentication, virtual storage server B_2 216 generates certificate signing request 228 to include one or more of a second UUID associated with virtual storage server B_2 216, a second authentication code associated with virtual storage server B_2 216, a second public key associated with virtual storage server B_2 216, and a signature over at least a portion of the certificate signing request 228 (e.g., utilizing a second private key of the virtual storage server B_2 216). Each virtual storage server 216 of the plurality of virtual storage servers 216 may be associated with a unique second UUID and a unique second authentication code even when two or more virtual storage servers 216 of the plurality of virtual storage servers 216 may be implemented with a common computing device. The second UUID and the second authentication code may be substantially the same as the UUID and the authentication code. The second public key and the second private key may be substantially the same as the public key and the private key. Next, virtual storage server B_2 216 sends the certificate signing request 228 to the container certificate authority 198. The container certificate authority 198 validates certificate signing request 228. When the certificate signing request 228 is valid, the container certificate authority 198 generates a signed certificate 230 to include one or more of a public key of container certificate authority 198, a certificate timeout indicator (e.g., 7 days), and a signed certificate signature over at least a portion of the signed certificate 230 (e.g., utilizing a private key of the container certificate authority 198). The virtual storage server B_2 216 saves the signed certificate 230 and utilizes the signed certificate 230 in at least one subsequent access request with at least one other entity associated with the container certificate authority 198 (e.g., storage server 1 of a plurality of storage servers 1-U).

In a still further example of authentication, storage server 1 generates certificate signing request 232 to include one or more of a UUID associated with storage server 1, an authentication code associated with storage server 1, a public key associated with storage server 1, and a signature over at least a portion of the certificate signing request 232 (e.g., utilizing a private key of the storage server 1). Next, the storage server 1 sends the certificate signing request 232 to the container certificate authority 198. The container certificate authority 198 validates certificate signing request 232. The validation includes indicating that the certificate signing request 232 is not valid when an entry on the updated storage server trust table 236 indicates that the storage server 1 is associated with a trust status of permanently untrusted. When the certificate signing request 232 is valid, the container certificate authority 198 generates a signed certificate 234 to include one or more of the public key of container certificate authority 198, a certificate timeout indicator (e.g., 7 days), and a signed certificate signature over at least a portion of the signed certificate 234 (e.g., utilizing the private key of the container certificate authority 198). The generating the signed certificate 234 includes updating the updated storage trust table 236 to indicate that storage server 1 is associated with a trust status of trusted. The updating includes sending the updated storage trust table 236 to one or more of at least one container controller and one or more of the plurality of virtual storage servers 216. The storage server 1 saves the signed certificate 234 and utilizes the signed certificate 234 in at least one subsequent access request and/or response with at least one other entity associated with the container certificate authority 198 (e.g., virtual storage server B_2 216).

Figure 8C:
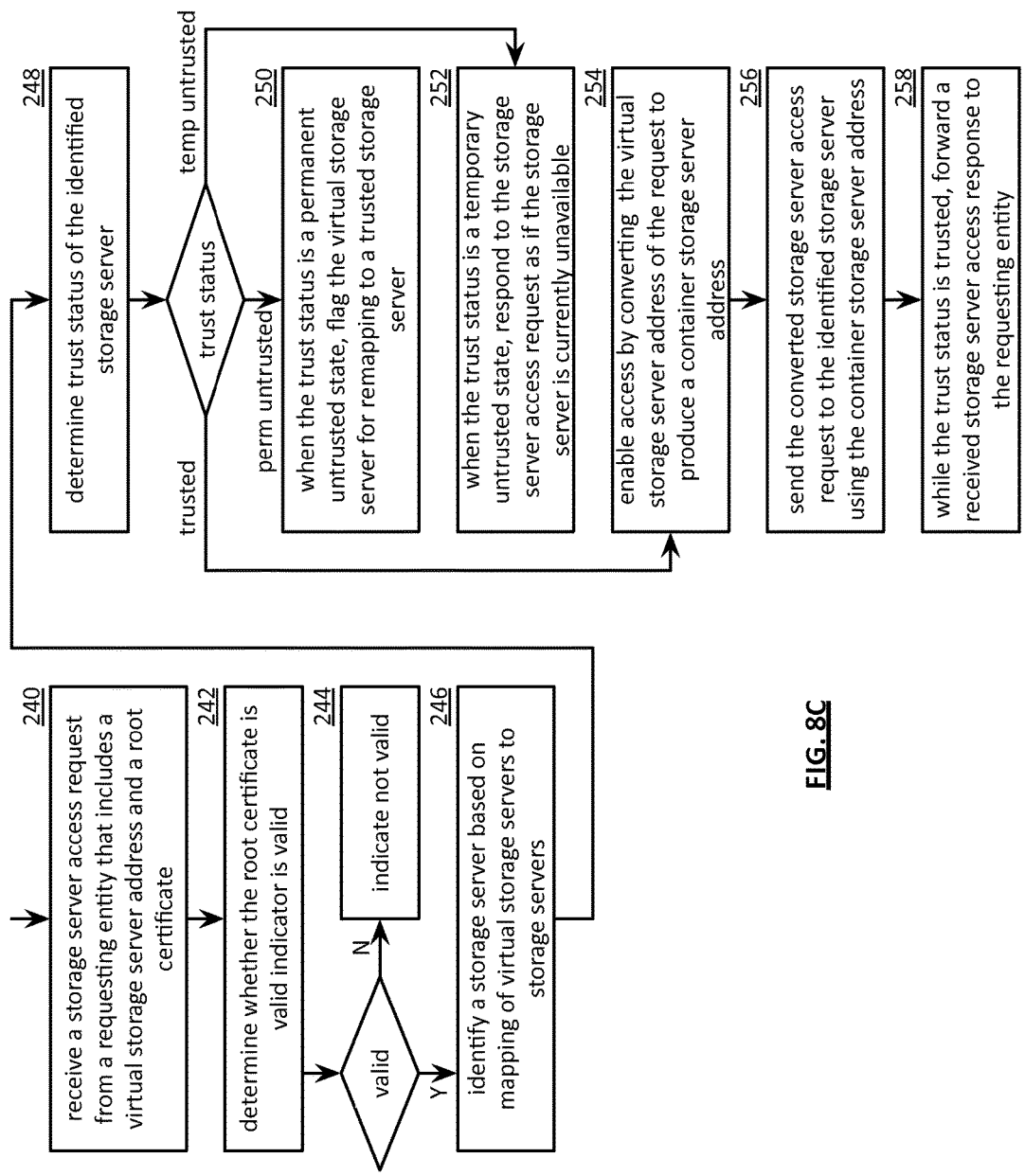
FIG. 8C is a flowchart illustrating an example of processing a storage server access request in accordance with the present invention.

FIG. 8C is a flowchart illustrating an example of processing a storage server access request. The method begins at step 240 where the processing module (e.g., of a container controller) receives a storage server access request, wherein the storage server access request includes a virtual storage server address of a virtual storage server of a plurality of virtual storage servers and a root certificate (e.g., a requesting entity root certificate authority signed certificate. The method continues at step 242 where the processing module determines whether the root certificate is valid. The method branches to step 246 when the processing module determines that the root certificate is valid. The method continues to step 244 when the processing module determines that the root certificate is not valid. The method continues at step 244 where the processing module indicates that the storage server access request and/or the root certificate is not valid. The indicating includes at least one of setting a flag, sending an error message, and sending a message to the requesting entity, wherein the message includes an indication that the storage server access request and/or the root certificate is not valid.

When the root certificate is valid, the method continues at step 246 where the processing module identifies a storage server of a plurality of storage servers based on a mapping of the plurality of virtual storage servers to the at least some of the plurality of storage servers. The method continues at step 248 where the processing module determines trust status of the identified storage server. The determining includes at least one of sending a request for re-authentication to the identified storage server, receiving an updated trust status based on a re-authentication response (e.g., received from at least one of the identified storage server and a container certificate authority), and accessing a trust table.

When the trust status is a permanent untrusted state, the method continues at step 250 where the processing module flags the virtual storage server for remapping to a trusted storage server of the plurality of storage servers. The remapping may subsequently invoke rebuilding or transfer of slices from the identified storage server to the trusted storage server.

When the trust status is a temporary untrusted state, the method continues at step 252 where the processing module responds to the storage server access request as if the storage server is currently unavailable. The responding includes at least one of sending the request for re-authentication to the identified storage server, outputting a storage server access response to the requesting entity that indicates that the storage server is not available, and allowing the storage server access request to timeout (e.g., ignore the request).

When the trust status of the identified storage server is trusted, the method continues at step 254 where the processing module enables access. The enabling includes at least one of sending the storage server access request to the identified storage server and converting the storage server access request. The processing module converts an address of the storage server access request from addressing of the plurality of virtual storage servers to addressing of the plurality of storage servers to produce a container storage server address.

When converting the storage server access request to enable access, the method continues at step 256 where the processing module sends the converted storage server access request to the identified storage server using the container storage server address such that identified storage server converts the container storage address into a physical address of one or more of a plurality of storage devices within the identified storage server, generates a storage server access response (e.g., to include an indicator of trust), and outputs the storage server access response. When converting the storage server access request to enable access, the method continues at step 258 where the processing module, while the trust status is trusted (e.g., the indicator of trust is validated), forwards a received storage server access response to the requesting entity.

Figure 9A:
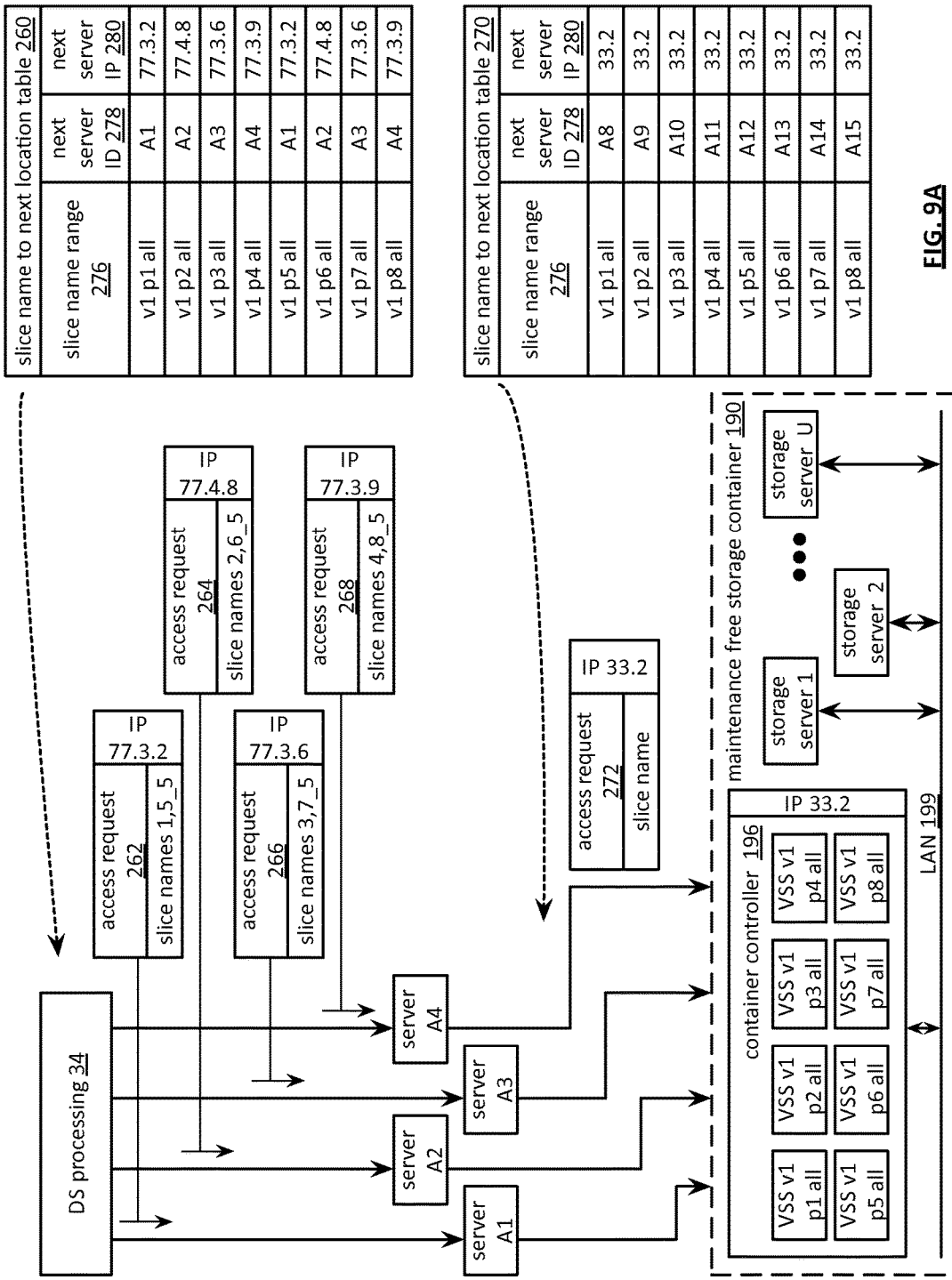
FIG. 9A is a schematic block diagram of another embodiment of a computing system in accordance with the present invention.

FIG. 9A is a schematic block diagram of another embodiment of a computing system that includes a dispersed storage (DS) processing 34, a set of servers A1-A4, and at least one maintenance free storage container 190. The maintenance free storage container 190 includes a plurality of storage servers 1-U, a container controller 196, and a local area network (LAN) 199. The servers A1-A4 include one or more of a site controller, a container controller 196, a DS processing unit 16, a user device, a server module, a virtual storage server, and a computing server.

Each storage server of the plurality storage servers 1-U includes a plurality of storage devices 200 and a server control module 202, wherein the server control module 202 manages storage and retrieval of data 204 from the plurality of storage devices 200, and wherein the maintenance free storage container 190 allows for multiple storage servers of the plurality of storage servers 1-U to be in a failure mode without replacement and allows for multiple storage devices 200 of the plurality of storage devices 200 of one or more the plurality of storage servers 1-U to be in the failure mode without replacement. Each storage device 200 includes one or more memory devices (e.g., a magnetic disk drive, an optical disk drive, solid-state memory, etc.).

The container controller 196 includes an external network interface 206, an internal network interface 208, and a module 210. The module 210 includes a plurality of virtual storage servers 216. Each virtual storage server of the plurality of virtual storage servers 216 includes hardware and/or software of module 210 to provide a storage server with respect to the DS processing unit for, wherein the DS processing 34 accesses each virtual storage server utilizing one or more dispersed storage network (DSN) addresses via one or more of the servers A1-A4. Alternatively, the DS processing unit 34 directly accesses the virtual storage servers 216 of the container controller 196. Alternatively, another set of servers such as the servers A1-A4 are implemented resulting in a sequential access through two sets of servers between the DS processing unit 34 and the container controller 196.

The DSN address includes a vault identifier and a pillar identifier, wherein the vault identifier identifies a virtual storage vault of a DSN and the pillar identifier identifies a specific pillar coded value of data encoded using a dispersed storage error coding function. For example, the container controller 196 includes a first virtual storage server corresponding to vault 1 and pillar 1 for all of an address range associated with vault 1 and pillar 1, a second virtual storage server corresponding to vault 1 and pillar 2 for all of an address range associated with vault 1 and pillar 2, a third virtual storage server corresponding to vault 1 and pillar 3 for all of an address range associated with vault 1 and pillar 3, a fourth virtual storage server corresponding to vault 1 and pillar 4 for all of an address range associated with vault 1 and pillar 4, a fifth virtual storage server corresponding to vault 1 and pillar 5 for all of an address range associated with vault 1 and pillar 5, a sixth virtual storage server corresponding to vault 1 and pillar 6 for all of an address range associated with vault 1 and pillar 6, a seventh virtual storage server corresponding to vault 1 and pillar 7 for all of an address range associated with vault 1 and pillar 2, and an eighth virtual storage server corresponding to vault 1 and pillar 2 for all of an address range associated with vault 1 and pillar 8 when vault 1 is associated with a pillar width of 8.

The container controller 196 is operable to establish, based on vault registry information, a first mapping of a plurality of virtual storage servers 216 of a vault to at least some of the plurality of storage servers 1-U based on storage server utilization information and storage server failure information. Vault registry information includes, for each vault of the plurality of vaults, one or more of a vault identifier (ID), a pillar width number, a decode threshold number, and data storage adjustment criteria. The storage server utilization information includes one or more of a storage device utilization level, a storage server utilization level, and a vault utilization level. The storage server utilization information may be obtained by one or more of obtaining utilization statistics, initiating a query, receiving test results, accessing historic performance records, a comparison of utilization information to one or more utilization thresholds, and receiving an error message receiving the storage server utilization information. The storage server failure information includes one or more of a failure indicator associated with a storage server, an availability level of the storage server, a reliability level of the storage server, and a performance level of the storage server. For example, virtual storage servers for vault 1 pillars 1-8 are established and an entire DSN address range corresponding to each pillar is mapped to storage servers 1-8 when the pillar width number is 8 and storage server failure information associated with storage servers 1-8 is favorable.

The container controller 196 is further operable to facilitate storage of encoded data slices in the at least some of the plurality of storage servers 1-U in accordance with the first mapping. The encoded data slices include data encoded into the encoded data slices in accordance with a dispersed storage error coding function. In an example of operation, DS processing 34 generates a set of access requests 262-268 for a set of slices at a fifth address within each of 8 ranges of slice names corresponding to 8 pillars of vault 1 utilizing a slice name to next location table 260. The DS processing 34 utilizes the slice name to next location table 260 to identify a next server identifier (ID) and a next server internet protocol address (IP) corresponding to the next server to send each request of the set of access requests 262-268 based on a slice name of each request. The slice name to next location table 260 includes a plurality of table entries, wherein each table entry corresponds to a vault and a pillar of the vault. Each table entry of the plurality of table entries includes a slice name range field 276, a next server ID field 278, and a next server IP address 280. The slice name range field 276 includes a slice name range entry identifying and associated vault, pillar, and range of slice names where the vault and pillar are fixed. The next server ID field 278 includes a next server ID entry corresponding to the table entry and an ID of a target server to send a request and/or message. The next server IP address field 280 includes a next server IP address entry corresponding to the table entry and an IP address of the target server to send the request and/or message. Structure of the slice name to next location table 260 may be utilized by a first layer of modules and/or system elements communicating to a next layer of modules and/or system elements such that a routing IP address is identified based on a slice name.

In the example of operation continued, the DS processing 34 sends the set of access requests 262-268 to next server IP addresses (e.g. to servers A1-A4), extracted from slice name to next location table 260 based on utilizing slice names as an index into the slice name range field 276. Next, each server of the set of servers A1-A4 utilizes slice name to next location table 270 to determine a next server IP address to forward the requests based on utilizing the slice names as an index into the slice name range field 276 of the slice name to next location table 270. Such a forwarded request 272 includes an IP address associated with the container controller 196. Each virtual storage server of the plurality of stored servers utilizes yet another slice name to next location table to identify storage server IDs and storage server IP addresses that are mapped utilizing the first mapping to the slice names. Such another slice name to next location table is discussed in greater detail with reference to FIGS. 9C-9E. Next, each virtual storage server forwards the set of requests to the identified storage servers utilizing the storage server IP addresses and including the storage server IDs.

FIG. 9B is a schematic block diagram of an embodiment of a maintenance free storage container 190 that includes a container controller 196, a local area network (LAN) 199, and a set of storage servers 1-8. The container controller 196 includes a set of virtual storage servers for each pillar 1-8 associated with a vault 1 when vault 1 utilizes a pillar width of 8. Each storage server of the set of storage servers 1-8 is associated with a unique internet protocol (IP) address to facilitate communications with one or more of the container controller 196 and the set of storage servers 1-8 via the LAN 199. For example, storage server 2 utilizes an IP address of 24.2 and the container controller 196 utilizes an IP address of 33.2. As such, each virtual storage server of the set of virtual storage servers may receive and send messages utilizing the IP address of 33.2. Further addressing may be provided by an identifier associated with each one of the virtual storage servers.

FIG. 9C is a table illustrating an example of a slice name to next location table 274 that includes a plurality of table entries, wherein each table entry of the plurality of table entries includes a slice name range field 276, a next server identifier (ID) field 278, and a next server internet protocol (IP) address field 280. The slice name to next location table 274 may be utilized as a first mapping of a set of virtual storage servers of a vault 1 to a set of storage servers 1-8. The set of storage servers includes identifiers of SS1-SS8 and corresponding IP addresses of 24.1-24.8. For example, all addresses of a fourth pillar of vault 1 are mapped to storage server 4 in accordance with the first mapping.

In example of operation, a virtual storage server receives a slice access request that includes a slice name. The virtual storage server matches a slice name range entry of the slice name to next location table 274 corresponding to the slice name to produce a table entry and extracts a store server ID and next server IP address from the table entry. Next, the virtual store server forwards the slice access request to the identified storage server utilizing the extracted next server IP address and including the extracted next server ID.

With such a first matching, a high level of reliability may be provided for storage of encoded data slices of the storage servers when favorable storage server utilization prevails to provide storage facilities for all pillars. The storage server utilization may increase as more data is stored in the set of storage servers. A container controller associated with the set of virtual storage servers may modify the first mapping to produce a second mapping when the storage server utilization becomes unfavorable. Such a modification of mapping is discussed in greater detail with reference to FIGS. 9D-9E.

FIG. 9D is a table illustrating another example of a slice name to next location table 282 that includes a plurality of table entries, wherein each table entry of the plurality of table entries includes a slice name range field 276, a next server identifier (ID) field 278, and a next server internet protocol (IP) address field 280. The slice name to next location table 282 may be utilized as a second mapping of a plurality of virtual storage servers of a vault 1 to at least some of a plurality of storage servers 1-8. A container controller associated with the set of virtual storage servers may modify a first mapping (e.g., as discussed with reference to FIG. 9C) to produce and utilize the second mapping. The container controller is operable to when, in light of data storage adjustment criteria of vault registry information, evaluation of storage server utilization information and the storage server failure information triggers an adjustment of the first mapping, adjust the first mapping in accordance with data storage adjustment criteria to produce the second mapping the plurality of virtual storage servers of the vault to the at least some of the plurality of storage servers. The data storage adjustment criteria includes, for the vault, one or more of a minimum data reliability requirement, a reliability requirement corresponding to a level of storage capacity utilization, and a maximum storage capacity utilization level.

The container controller is further operable to adjust the first mapping by reassigning a portion of a dispersed storage network (DSN) address range assigned to a first storage server of the plurality of storage servers to a second storage server of the plurality of storage servers. The reassigning includes interpreting the storage server utilization information to identify the first storage server. For example, the first storage server is identified based on detecting a vault utilization level that is greater than a vault utilization level threshold. As another example, the first storage server is identified based on detecting that transfer of slices can remedy an issue with another pillar where not enough encoded data slices are stored (e.g., higher order the encoded data slices beyond a decode threshold number). The reassigning further includes identifying a virtual storage server associated with the storage server for remapping and identifying the portion of the DSN address range associated with the virtual storage server for remapping based on the storage server utilization information; (e.g., portion of DSN address associated with slices to transfer). The reassigning further includes selecting the second storage server for the mapping adjustment based on one or more of the storage server utilization information, a current mapping of the first storage server and the portion of the DSN address range. For example, the second storage server is selected when the second store has storage capacity to accommodate receiving encoded data slices corresponding to the portion of the DSN address range. The reassigning further includes updating the virtual storage server mapping to exclude an association of the portion of the DSN address range with the first storage server and to include an association of the portion of the DSN address range with the second storage server.

In an example of operation, when the storage server utilization information is unfavorable, the container controller maps 75% of a slice name range corresponding to pillar 1 of vault 1 from storage server 1 to storage server 1, remaps a remaining 25% of the slice name range corresponding to pillar 1 of vault 1 from storage server 1 to storage server 5, maps 75% of a slice name range corresponding to pillar 2 of vault 1 from storage server 2 to storage server 2, remaps a remaining 25% of the slice name range corresponding to pillar 2 of vault 1 from storage server 2 to storage server 6, maps 75% of a slice name range corresponding to pillar 3 of vault 1 from storage server 3 to storage server 3, remaps a remaining 25% of the slice name range corresponding to pillar 3 of vault 1 from storage server 3 to storage server 7, maps 75% of a slice name range corresponding to pillar 4 of vault 1 from storage server 4 to storage server 4, remaps a remaining 25% of the slice name range corresponding to pillar 4 of vault 1 from storage server 4 to storage server 8 to produce a portion of the second mapping when a pillar width is 8, a decode threshold is 4, and data storage adjustment criteria requires continuing to store 100% of slices associated with 100% of address ranges associated with pillars 1-4.

In the example of operation continued, the container controller maps 50% of a slice name range corresponding to pillar 5 of vault 1 from storage server 5 to storage server 5, remaps a remaining 50% of the slice name range corresponding to pillar 5 of vault 1 from storage server 5 to storage server 6, maps 50% of a slice name range corresponding to pillar 6 of vault 1 from storage server 6 to storage server 6, and remaps a remaining 50% of the slice name range corresponding to pillar 6 of vault 1 from storage server 6 to storage server 8 to produce a remaining portion of the second mapping when a pillar width is 8, a decode threshold is 4, and the data storage adjustment criteria enables discarding of two pillars of higher order error encoded slices. As such, virtual storage servers associated with pillars 7 and 8 are no longer mapped to storage servers within the second mapping. The container controller is further operable to facilitate storage of new encoded data slices in the at least some of the plurality of storage servers based on the second mapping.

The container controller is operable to facilitate modification of storage of the encoded data slices stored in accordance with the first mapping based on the data storage adjustment criteria. The container controller is further operable to facilitate modification of storage of the encoded data slices by identifying encoded data slices of the encoded data slices stored in accordance with the first mapping for transfer from a first storage server of the plurality of storage servers to a second storage server of the plurality of storage servers to produce identified encoded data slices, facilitating transfer of the identified encoded data slices to the second storage server, and updating the storage server utilization information in accordance with the transferring of the identified encoded data slices. For example, the container controller transfers slices associated with the 25% of the slice name address range of pillar one of vault 1 from storage server 1 to storage server 5.

The container controller is further operable to facilitate modification of storage of the encoded data slices by identifying encoded data slices of the encoded data slices stored in accordance with the first mapping for overwriting and updating the storage server utilization information in accordance with the overwriting of the identified encoded data slices. The container controller is further operable to facilitate modification of storage of the encoded data slices by modifying parameters of a dispersed storage coding function based on the data storage adjustment criteria to produce modified parameters and facilitating modification of storage of the encoded data slices utilizing the modified parameters. For example, the container controller increases the pillar width from 8 to 16 when a lowered favorable storage server utilization is detected. As another example, the container controller decreases the pillar width from 8 to 6 when a higher unfavorable storage server utilization is detected.

The container controller is further operable to establish, based on second vault registry information (e.g., for another vault), a third mapping of a second plurality of virtual storage servers of a second vault to a second at least some of the plurality of storage servers based on the storage server utilization information and the storage server failure information and facilitate storage of second encoded data slices in the second at least some of the plurality of storage servers in accordance with the third mapping. The container controller is further operable to when, in light of second data storage adjustment criteria of the second vault registry information, evaluation of the storage server utilization information and the storage server failure information triggers an adjustment of the third mapping, adjust the third mapping in accordance with the second data storage adjustment criteria to produce a fourth mapping the second plurality of virtual storage servers of the vault to the second at least some of the plurality of storage servers. The container controller is further operable to facilitate storage of new second encoded data slices in the second at least some of the plurality of storage servers based on the fourth mapping and facilitate modification of storage of the second encoded data slices stored in accordance with the third mapping based on the second data storage adjustment criteria.

FIG. 9E is a table illustrating another example of a slice name to next location table 284 that includes a plurality of table entries, wherein each table entry of the plurality of table entries includes a slice name range field 276, a next server identifier (ID) field 278, and a next server internet protocol (IP) address field 280. The slice name to next location table 284 may be utilized as a third mapping of a plurality of virtual storage servers of a vault 1 to at least some of a plurality of storage servers 1-8. A container controller associated with the set of virtual storage servers may modify a second mapping (e.g., as discussed with reference to FIG. 9D) to produce and utilize the third mapping. The container controller is operable to when, in light of data storage adjustment criteria of vault registry information, evaluation of storage server utilization information and storage server failure information triggers an adjustment of the second mapping, adjust the second mapping in accordance with data storage adjustment criteria to produce the third mapping the plurality of virtual storage servers of the vault to the at least some of the plurality of storage servers.

In an example of operation, when the storage server utilization information is unfavorable, the container controller maps 50% of a slice name range corresponding to pillar 1 of vault 1 from storage server 1 to storage server 1, remaps a remaining 50% of the slice name range corresponding to pillar 1 of vault 1 from storage servers 1 and 5 to storage server 5, maps 50% of a slice name range corresponding to pillar 2 of vault 1 from storage server 2 to storage server 2, remaps a remaining 50% of the slice name range corresponding to pillar 2 of vault 1 from storage servers 2 and 6 to storage server 6, maps 50% of a slice name range corresponding to pillar 3 of vault 1 from storage server 3 to storage server 3, remaps a remaining 50% of the slice name range corresponding to pillar 3 of vault 1 from storage servers 3 and 7 to storage server 7, maps 50% of a slice name range corresponding to pillar 4 of vault 1 from storage server 4 to storage server 4, remaps a remaining 50% of the slice name range corresponding to pillar 4 of vault 1 from storage servers 4 and 8 to storage server 8 to produce a portion of the third mapping when a pillar width is 8, a decode threshold is 4, and data storage adjustment criteria requires continuing to store 100% of slices associated with 100% of address ranges associated with pillars 1-4.

In the example of operation continued, the container controller excludes mapping a slice name range corresponding to pillars 5, 6, 7, and 8 of vault 1 to any storage server to produce a remaining portion of the third mapping when a pillar width is 8, a decode threshold is 4, and the data storage adjustment criteria enables discarding of up to 4 pillars of higher order error encoded slices when the storage server utilization information is unfavorable and creating desired storage capacity requires elimination of storing encoded data slices of all but a decode threshold number of pillars. As such, virtual storage servers associated with pillars 5-8 are no longer mapped to storage servers within the third mapping. The container controller is further operable to facilitate storage of new encoded data slices in the at least some of the plurality of storage servers based on the third mapping.

The container controller is further operable to facilitate modification of storage of the encoded data slices by identifying encoded data slices of the encoded data slices stored in accordance with the first mapping for transfer to another maintenance free storage container to produce identified encoded data slices, facilitating transfer of the identified encoded data slices to the other maintenance free storage container, and updating the storage server utilization information in accordance with the transferring of the identified encoded data slices. For example, the container controller selects the identified encoded data slices that are associated with vaults that are associated with an unfavorably high storage server utilization level, sends the identified encoded data slices to the other maintenance free storage container, receives a storage confirmation from the other maintenance free storage container, and deletes the identified encoded data slices. Transfer of encoded data slices from a maintenance free storage container to another maintenance free storage container is discussed in greater detail with reference to FIGS. 9F-9I.

Figure 9F:
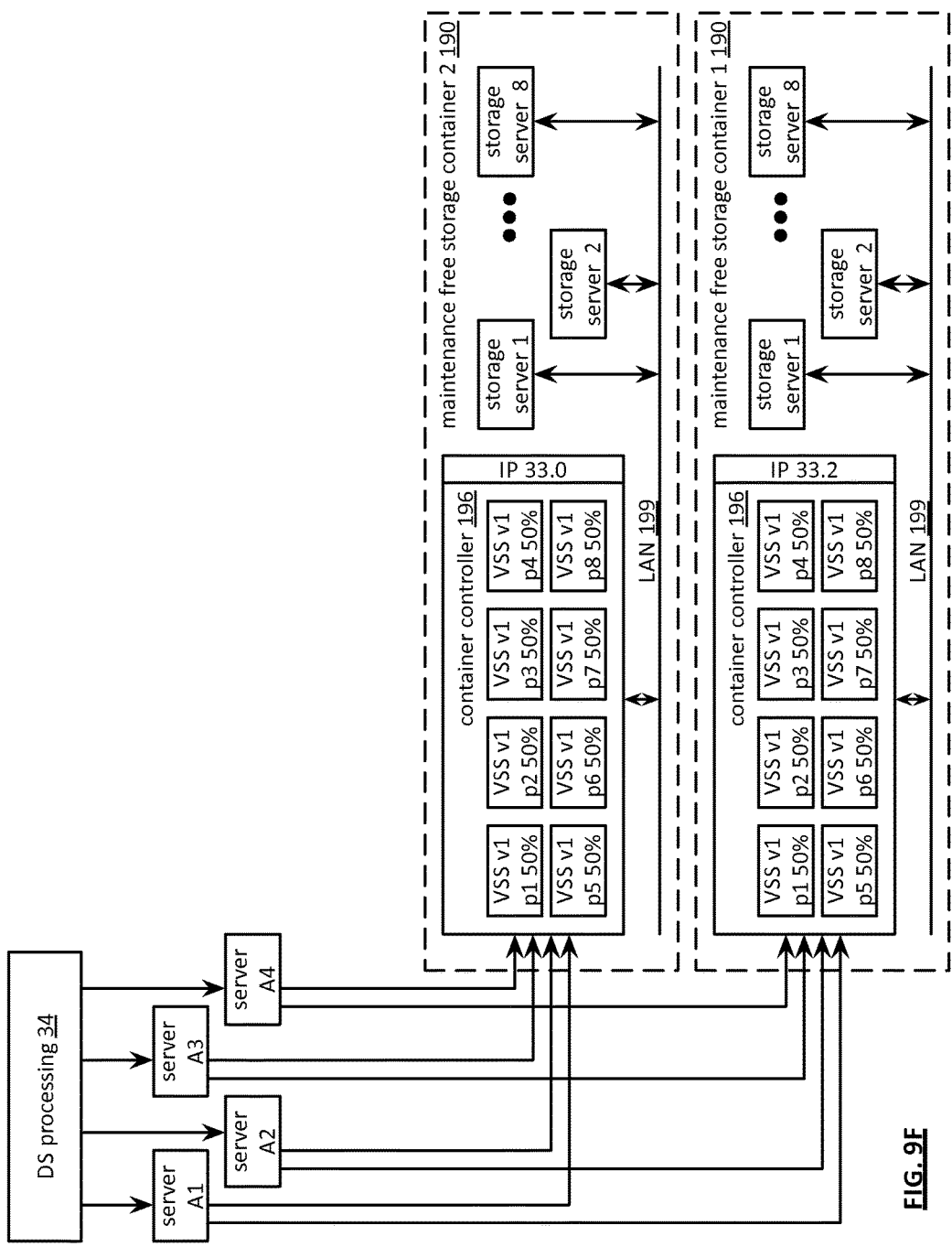
FIG. 9F is a schematic block diagram of another embodiment of a computing system in accordance with the present invention.
Figure 9J:
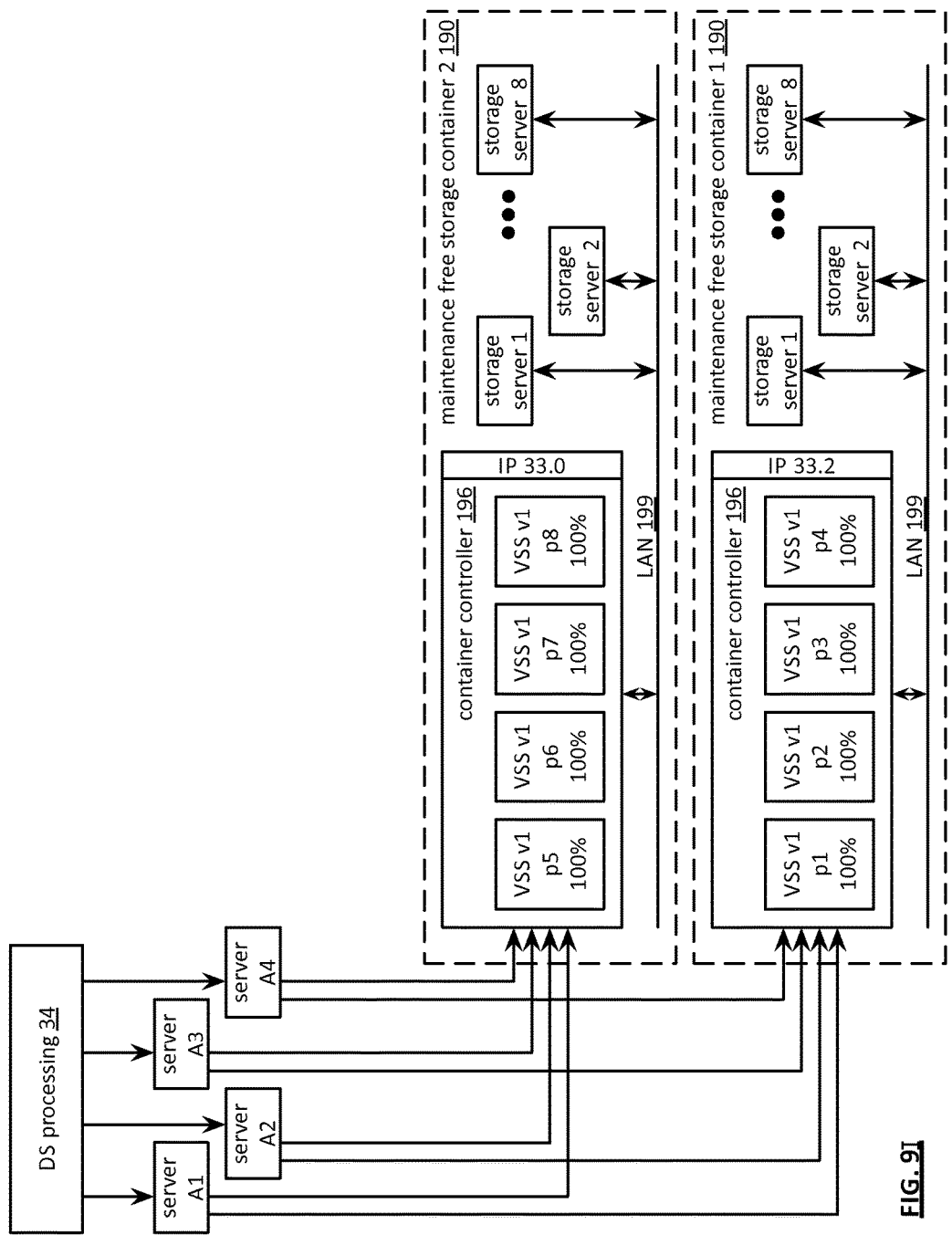
FIG. 9B is a schematic block diagram of an embodiment of a maintenance free storage container in accordance with the present invention.
FIG. 9C is a table illustrating an example of a slice name to next location table in accordance with the present invention.
FIG. 9D is a table illustrating another example of a slice name to next location table in accordance with the present invention.
FIG. 9E is a table illustrating another example of a slice name to next location table in accordance with the present invention.
FIG. 9G is a table illustrating another example of a slice name to next location table in accordance with the present invention.

FIG. 9F is a schematic block diagram of another embodiment of a computing system that includes a dispersed storage (DS) processing 34, a set of servers A1-A4, and two or more maintenance free storage containers 1-2 190. Each maintenance free storage container 190 includes a plurality of storage servers 1-U, a container controller 196, and a local area network (LAN) 199. The servers A1-A4 include one or more of a site controller, a container controller 196, a DS processing unit 16, a user device, a server module, and a computing server.

The container controller 196 includes plurality of virtual storage servers. The container controller 196 is operable to assign a dispersed storage network (DSN) address range to each virtual storage server and for each virtual storage server, map the DSN address range to at least some of the plurality of storage serves in accordance with a mapping. For example, the container controller 196 of maintenance free storage container 1 190 modifies a second mapping of virtual storage servers of maintenance free storage container 1 190 to produce a third mapping that includes mapping of the virtual storage servers of maintenance free storage container 1 190 to storage servers 1-8 of maintenance free storage container 1 190 and includes mapping of the virtual storage servers of maintenance free storage container 2 190 to storage servers 1-8 of maintenance free storage container 2 190 when maintenance free storage container 2 190 is added to the computing system.

The container controller 196 of maintenance free storage container 1 190 may produce the third mapping in accordance with data storage adjustment criteria indicating how to reassign the DSN address ranges associated with each pillar when an additional maintenance free storage container 2 190 is added to the computing system. The container controller 196 determines the third mapping such that the DSN address ranges associated with each pillar are split such that each virtual storage server includes 50% of the pillar slice name range when the data storage adjustment criteria indicates to split each pillar between each maintenance free storage container. For example, a first 50% of slice name ranges associated with vault 1 pillar 1 are associated with a virtual storage server of the maintenance free storage container 1 190 and a remaining 50% of slice name ranges associated with vault 1 pillar 1 are associated with a virtual storage server of the maintenance free storage container 2 190. Transitioning from the second mapping to the third mapping is discussed in greater detail with reference to FIGS. 9G and 9H.

FIG. 9G is a table illustrating another example of a slice name to next location table 282 as a second mapping associated with a maintenance free storage container 1 as previously discussed with reference to FIG. 9D. The second mapping is transition to a third mapping when a maintenance free storage container 2 is added to store encoded data slices that were previously only stored in maintenance free storage container 1. The third mapping is discussed in greater detail with reference to FIG. 9H.

FIG. 9H includes tables illustrating more examples of slice name to next location tables 288 and 290 as a third mapping associated with a maintenance free storage container 1 and a maintenance free storage container 2 after transitioning from a second mapping that only included the maintenance free storage container 1. A container controller produces the third mapping in accordance with data storage adjustment criteria indicating how to reassign dispersed storage network (DSN) address ranges associated with each pillar when the additional maintenance free storage container 2 is added to the maintenance free storage container 1. The container controller determines the third mapping such that the DSN address ranges associated with each pillar are split such that each virtual storage server includes 50% of the pillar slice name range when the data storage adjustment criteria indicates to split each pillar between each maintenance free storage container. For example, a first 50% of the DSN address range associated with pillar 1 vault 1 is mapped to storage server 1 of container 1, a first 50% of the DSN address range associated with pillar 2 vault 1 is mapped to storage server 2 of container 1, through a first 50% of the DSN address range associated with pillar 8 vault 1 is mapped to storage server 8 of container 1 and a second 50% of the DSN address range associated with pillar 1 vault 1 is mapped to storage server 1 of container 2, a second 50% of the DSN address range associated with pillar 2 vault 1 is mapped to storage server 2 of container 2, through a second 50% of the DSN address range associated with pillar 8 vault 1 is mapped to storage server 8 of container 2.

The container controller modifies storage of encoded data slices in the storage servers by transferring some of the encoded data slices from container 1 to container 2. For example, slices associated with 25% of the DSN address range of pillar 1 of vault 1 are transferred from storage server 1 of container 1 to storage server 1 of container 2 and all the slices of pillar 1 of vault 1 (e.g. representing 25% of the address range of pillar 1 of vault 1) stored in storage server 5 of container 1 are transferred to storage server 1 of container 2. The container controller may further remap the third mapping to produce a fourth mapping in a similar fashion as to the remapping discussed previously moving from the mapping of FIG. 9D to the mapping of FIG. 9E as storage server utilization information indicates an unfavorably higher utilization level of the storage servers.

FIG. 9I is a schematic block diagram of another embodiment of a computing system that includes a dispersed storage (DS) processing 34, a set of servers A1-A4, and two or more maintenance free storage containers 1-2 190. Each maintenance free storage container 190 includes a plurality of storage servers 1-U, a container controller 196, and a local area network (LAN) 199. The servers A1-A4 include one or more of a site controller, a container controller 196, a DS processing unit 16, a user device, a server module, and a computing server.

The container controller 196 includes plurality of virtual storage servers. The container controller 196 is operable to assign a dispersed storage network (DSN) address range to each virtual storage server and for each virtual storage server, map the DSN address range to at least some of the plurality of storage serves in accordance with a mapping. For example, the container controller 196 of maintenance free storage container 1 190 modifies a second mapping of virtual storage servers of maintenance free storage container 1 190 to produce a third mapping that includes mapping of the virtual storage servers of maintenance free storage container 1 190 to storage servers 1-8 of maintenance free storage container 1 190 and includes mapping of the virtual storage servers of maintenance free storage container 2 190 to storage servers 1-8 of maintenance free storage container 2 190 when maintenance free storage container 2 190 is added to the computing system.

The container controller 196 of maintenance free storage container 1 190 may produce the third mapping in accordance with data storage adjustment criteria indicating how to reassign the DSN address ranges associated with each pillar when an additional maintenance free storage container 2 190 is added to the computing system. The container controller 196 determines the third mapping such that one or the other maintenance free storage container includes virtual storage servers that each are assigned 100% of the DSN address range of a given pillar. The pillar assignments are split between the two storage controllers. For example, maintenance free storage container 1 190 includes a first virtual storage server assigned to 100% of slice name ranges associated with vault 1 pillar 1, a second virtual storage server assigned to 100% of slice name ranges associated with vault 1 pillar 2, a third virtual storage server assigned to 100% of slice name ranges associated with vault 1 pillar 3, and a fourth virtual storage server assigned to 100% of slice name ranges associated with vault 1 pillar 4 and maintenance free storage container 2 190 includes a first virtual storage server assigned to 100% of slice name ranges associated with vault 1 pillar 5, a second virtual storage server assigned to 100% of slice name ranges associated with vault 1 pillar 6, a third virtual storage server assigned to 100% of slice name ranges associated with vault 1 pillar 7, and a fourth virtual storage server assigned to 100% of slice name ranges associated with vault 1 pillar 8.

Each virtual storage server may map to one or more associated storage servers. For example, the first virtual storage server of maintenance free storage container 1 190 maps to storage servers 1 and 2 of maintenance free storage container 1 190, the second virtual storage server of maintenance free storage container 1 190 maps to storage servers 3 and 4 of maintenance free storage container 1 190, the third virtual storage server of maintenance free storage container 1 190 maps to storage servers 5 and 6 of maintenance free storage container 1 190, the fourth virtual storage server of maintenance free storage container 1 190 maps to storage servers 7 and 8 of maintenance free storage container 1 190, and the first virtual storage server of maintenance free storage container 2 190 maps to storage servers 1 and 2 of maintenance free storage container 2 190, the second virtual storage server of maintenance free storage container 2 190 maps to storage servers 3 and 4 of maintenance free storage container 2 190, the third virtual storage server of maintenance free storage container 2 190 maps to storage servers 5 and 6 of maintenance free storage container 2 190, and the fourth virtual storage server of maintenance free storage container 2 190 maps to storage servers 7 and 8 of maintenance free storage container 2 190.

FIG. 10 is a flowchart illustrating an example of retrieving a data segment. The method begins with step 300 where a processing module (e.g., of a dispersed storage (DS) processing unit) receives a request to retrieve a data segment. The request may include one or more of an object number, a file identifier (ID), a second number, and a requesting entity ID. The method continues at step 302 where the processing module obtains storage information. The storage information includes one or more of a DS unit ID, a DS unit internet protocol (IP) address, a vault ID, a segmentation method, a decode threshold number, a pillar width number, a maintenance free storage container topology, and an assignment of a pillar to a container and a DS unit and/or virtual storage server within the container. The obtaining may be based on one or more of receiving the storage information with the request, accessing a registry, a lookup, and a predetermination.

The method continues at step 304 where the processing module sends encoded data slice retrieval requests for a decode threshold number of encoded data slice pillars to two or more containers. The sending includes generating the requests based on the storage information and the data segment request. The sending further includes outputting the encoded data slice retrieval requests to DS units based on the storage information. For example, the processing module sends encoded data slice retrieval requests for half of the decode threshold number of encoded data slice pillars to a first container controller and sends encoded data slice retrieval requests for a remaining half of the decode threshold number of encoded data slice pillars to a second container controller to provide distributed access loading and improved retrieval latency performance.

The method continues at step 306 where the processing module receives encoded data slices. A container controller may prioritize returning encoded data slices corresponding to primary pillars (e.g., slices generated from a unity matrix within a generator matrix utilized in a dispersed storage error coding function) over non-primary pillars (e.g. error coded slices generated from a portion of the generator matrix not associated with the unity matrix). For example, a container controller 1 sends encoded data slices corresponding to pillars 1 and 3 when DS units 1 and 3 are available and pillars 1 and 3 are primary pillars. As another example, container controller 1 sends encoded data slices corresponding to pillars 5 and 7 (e.g., non-primary pillars) when DS units 1 and 3 are not available.

The method continues at step 308 where the processing module determines whether a decode threshold number of encoded data slices have been received by comparing a number of received encoded data slices to the decode threshold number. The method branches to step 312 when the processing module determines that the decode threshold number of encoded data slices have not been received. The method continues to step 300 and when the processing module determines that the decode threshold number of encoded data slices have been received. The method continues at step 310 where the processing module dispersed storage error decodes the encoded data slices to produce the data segment. The method continues at step 312 where the processing module sends at least one encoded data slice retrieval request for additional pillars to at least one container when the processing module determines that the decode threshold number of encoded data slices have not been received. For example, the processing module sends the at least one encoded data slice retrieval request to an additional container. As another example, the processing module sends the at least one encoded data slice retrieval request, for an encoded data slice corresponding to an additional pillar, to a first container controller (e.g., of a previous retrieval request). The method branches back to step 306 to receive another slice.

A container controller of a maintenance free storage container is operable to facilitate access to a maintenance free storage container by receiving a request for two or more slices from a requesting entity, wherein the slices are associated with at least two pillars, identifying at least one priority slice of the two or more slices (e.g., identify based on: encoding parameters, a flag, a slice name, for instance—priority slice produced from unity matrix to enable fast segment decode by the requesting entity), and determining an availability level for each priority slice of the at least one priority slice (e.g., available, not available). The container controller is further operable to, for each priority slice of the at least one priority slice that is available, outputting the priority slice to the requesting entity. The container controller is further operable to, for each priority slice of the at least one priority slice that is unavailable, facilitate rebuilding the priority slice utilizing associated slices stored within the maintenance free storage container to produce a rebuilt priority slice and output the rebuilt priority slice to the requesting entity.

FIG. 11 is a flowchart illustrating an example of rebuilding an encoded slice. The method begins at step 314 where a processing module (e.g., of a container controller of a maintenance free storage container) determines an encoded data slice to be rebuilt. The determination may be based on one or more of a query, a lookup, an error message, detecting a missing slice, and detecting a slice with unfavorable integrity information. The method continues at step 316 where the processing module sends encoded data slice retrieval requests to each dispersed storage (DS) unit and/or virtual storage server of a home container corresponding to the encoded data slice to be rebuilt. The retrieval from the DS units of the container corresponding to the encoded data slice to rebuild may provide a system enhancement by minimizing retrieval access latency. The method continues at step 318 where the processing module sends an encoded data slice retrieval request to another container when at least a decode threshold number of encoded data slice retrieval requests have not been sent (e.g., within the home container).

The method continues at step 320 where the processing module receives a decode threshold number of encoded data slices (e.g., primarily from the DS units of the home container and at least one encoded data slice from another container). The method continues at step 322 where the processing module dispersed storage error decodes the decode threshold number of encoded data slices to produce a data segment. The method continues at step 324 where the processing module dispersed storage error encodes the data segment to produce a set of encoded data slices that includes the encoded data slice to be rebuilt. The method continues at step 326 where the processing module sends the rebuilt encoded data slice to a corresponding DS unit and/or virtual storage server for storage therein. For example, the processing module sends a write request message that includes the rebuilt encoded data slice to a DS unit of the home container, when the encoded data slice is missing from the DS unit. As another example, the processing module sends a write request message that includes the rebuilt encoded data slice to a foster DS unit (e.g., a temporary storage location) associated with the home container.

FIG. 12A is a schematic block diagram of another embodiment of a computing system. The system includes a site, wherein the site includes two maintenance free storage containers 1-2 190. The first container includes a container controller 1 196, a plurality of storage servers 1, 3, 5, 7, and 9 (e.g., associated with odd numbered pillars), and a common local area network (LAN) 199. The second container includes a container controller 2 196, a plurality of storage servers 2, 4, 6, 8, and 10 (e.g., associated with even numbered pillars), and a LAN 199. The system may be associated with a pillar width to decode threshold relationship of >2:1, wherein the pillar width is greater than twice the decode threshold. In such an arrangement, it is possible to retrieve a decode threshold number of encoded slices at least two ways from a set (e.g., a pillar width number of a common data segment) of encoded slices. For example, and encoded data slice of pillar 1 is stored in storage server 1, an encoded data slice of pillar 2 is stored in storage server 2, etc. through an encoded data slice of pillar 10 is stored at storage server 10, when a pillar width is 10 and a decode threshold is 4.

A corresponding data segment may be reproduced by retrieving any 4 encoded data slices of the set of 10 encoded data slices. For example, the data segment may be reproduced by retrieving encoded data slices from storage servers 3, 5, 7, and 9 by facilitating access via the LAN 199 associated with container 1. As another example, the data segment may be reproduced by retrieving encoded slices from storage servers 2, 4, 6, and 8 by facilitating access via the LAN 199 associated with container 2. As yet another example, the data segment may be reproduced by retrieving encoded data slices from storage servers 1-4 by facilitating access via LAN 199 associated with container 1 and 2. As still another example, the data segment may be reproduced by retrieving encoded data slices from storage servers 7-10 by facilitating access via LAN 199 associated with container 1 and 2.

In such a system, any single encoded data slice to be rebuilt and associated with a storage server may be reproduced based on retrieving encoded data slices from other storage servers associated with a common container when all the other storage servers are available. For example, container controller 1 determines to reproduce a rebuilt encoded data slice of DS unit 5. The container controller 1 196 retrieves a decode threshold number of encoded data slices from storage servers 1, 3, 7, and 9 and dispersed storage error decodes the decode threshold number of encoded data slices to reproduce a data segment. The container controller 1 196 dispersed storage error encodes the data segment to reproduce the rebuilt encoded data slice. The container controller 1 196 sends the rebuilt encoded data slice to storage server 5 for storage therein. The method of operation of such a rebuilding process is described in greater detail with reference to FIG. 12B.

FIG. 12B is a flowchart illustrating another example of rebuilding an encoded slice, which includes similar steps to FIGS. 10 and 11. The method begins with steps 314 and 316 of FIG. 11 where a processing module (e.g. of a container controller) determines a slice to be rebuilt and sends slice retrieval requests to each DS unit (e.g., virtual storage server) of a home container corresponding to the slice to be rebuilt. The method continues with steps 306 and 308 of FIG. 10 where the processing module receives encoded data slices and determines whether a decode threshold number of encoded data slices have been received. The method branches to step 322 of FIG. 11 when the processing module determines that the decode threshold number of encoded data slices have been received. The method continues to step 318 of FIG. 11 when the processing module determines that the decode threshold number of encoded data slices have not been received. The method continues with step 318 of FIG. 11 where the processing module sends an encoded data slice retrieval request to another container. The method loops back to step 306 of FIG. 10 to receive another slice.

The method continues with steps 322-316 of FIG. 11 where the processing module dispersed storage error decodes the decode threshold number of encoded data slices to produce a data segment, dispersed storage error encodes the data segment to produce the encoded data slice to be rebuilt, and sends the rebuilt encoded data slice to a corresponding DS unit for storage therein when the processing module determines that the decode threshold number of encoded data slices have been received.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprises:
    sending, by a computing device, an access request to one or more site controllers, wherein the access request is regarding one or more sets of encoded data slices having one or more sets of dispersed storage network (DSN) addresses;
    identifying, by the one or more site controllers, one or more storage containers based on the one or more sets of DSN addresses, wherein a storage container of the one or more storage containers includes a container controller and a plurality of storage units, wherein a storage unit of the plurality of storage units includes a plurality of storage devices;
    sending, by the one or more site controllers, the access request to the one or more identified storage containers;
    interpreting, by a container controller of one of the one or more identified storage containers, the access request to identify one or more storage units of the plurality of storage units affiliated with one or more DSN addresses of the one or more sets of DSN addresses;
    determining, by the container controller, whether the one or more storage units is in a storage failure mode with regard to the one or more DSN addresses;
    when the one or more storage units is in the storage failure mode, determining, by the container controller, whether to rebuild, to change virtual to physical address mapping, or to migrate one or more encoded data slices of the one or more sets of encoded data slices associated with the one or more DSN addresses concerning the storage failure mode; and
    when the one or more encoded data slices is to be rebuilt, facilitating, by the container controller, rebuilding of the one or more encoded data slices.

2. The method of claim 1, wherein the storage failure mode comprises one of:
    a storage location failure within a storage device of the plurality of storage devices of the storage unit;
    a storage device failure within the storage unit;
    a storage unit failure;
    a missing encoded data slice; and
    a corrupted encoded data slice.

3. The method of claim 1, wherein the access request comprises one of:
    a read request;
    a write request; and
    a data storage integrity verification.

4. The method of claim 1 further comprises:
    when the one or more storage units is in the storage failure mode and the container controller determines to rebuild an encoded data slice of the one or more encoded data slices:
        determining, by the container controller, whether a decode threshold number of encoded data slices of a set of encoded data slices of the one or more sets of encoded data slices is stored in the plurality of storage units within the storage container that includes the container controller, wherein the set of encoded data slices includes the encoded data slice; and when the decode threshold number of encoded data slices is stored in the plurality of storage units, rebuilding, by the container controller, the encoded data slice based on the decode threshold number of encoded data slices.

5. The method of claim 4 further comprises:

when the decode threshold number of encoded data slices is not stored in the plurality of storage units, forwarding, by the container controller, a rebuild request for the encoded data slices to a site controller of the one or more site controllers;

retrieving, by the site controller, the decode threshold number of encoded data slices from a plurality of storage containers of the one or more storage containers; and rebuilding, by the site controller, the encoded data slice based on the decode threshold number of encoded data slices.

6. The method of claim 1 further comprises:

when the one or more storage units is in the storage failure mode and the container controller determines to migrate the one or more encoded data slices:

determining, by the container controller, whether the one or more sets of encoded data slices are stored in the plurality of storage units within the storage container that includes the container controller, wherein the set of encoded data slices includes the one or more encoded data slices; and when the one or more encoded data slices are stored in the plurality of storage units, migrating, by the container controller, the one or more encoded data slices to different storage locations within the plurality of storage units.

7. The method of claim 6 further comprises:

when the one or more encoded data slices are not stored in the plurality of storage units, forwarding, by the container controller, a migrate request a site controller of the one or more site controllers; and migrating, by the site controller, the one or more encoded data slices to different storage containers of the plurality of storage containers.

8. The method of claim 1 further comprises:

when the one or more storage units is in the storage failure mode and the container controller determines to change virtual to physical address mapping for the one or more encoded data slices:

detecting, by the container controller, a failure of a physical storage location within the plurality of storage units of the storage container, wherein the storage location is mapped to a DSN address of the one or more DSN addresses;

identifying, by the container controller, a different physical address location within the plurality of storage units that has not failed; and mapping the DSN address to the different physical address location.

9. A non-transitory computer readable storage device comprises:

a first storage section that stores operational instructions that, when executed by a computing device, causes the computing device to:

send an access request to one or more site controllers, wherein the access request is regarding one or more sets of encoded data slices having one or more sets of dispersed storage network (DSN) addresses;

a second storage section that stores operational instructions that, when executed by a site controller of the one or more site controllers, causes the site controller to:

identify one or more storage containers based on the one or more sets of DSN addresses, wherein a storage container of the one or more storage containers includes a container controller and a plurality of storage units, wherein a storage unit of the plurality of storage units includes a plurality of storage devices; and send the access request to the one or more identified storage containers;

a third storage section that stores operational instructions that, when executed by a container controller of the one or more container controllers, causes the container controller to:

interpret the access request to identify one or more storage units of the plurality of storage units affiliated with one or more DSN addresses of the one or more sets of DSN addresses;

determine whether the one or more storage units is in a storage failure mode with regard to the one or more DSN addresses;

when the one or more storage units is in the storage failure mode, determine whether to rebuild, to change virtual to physical address mapping, or to migrate one or more encoded data slices of the one or more sets of encoded data slices associated with the one or more DSN addresses concerning the storage failure mode; and when the one or more encoded data slices is to be rebuilt, facilitate rebuilding of the one or more encoded data slices.

10. The non-transitory computer readable storage device of claim 9, wherein the storage failure mode comprises one of:

a storage location failure within a storage device of the plurality of storage devices of the storage unit;

a storage device failure within the storage unit;

a storage unit failure;

a missing encoded data slice; and a corrupted encoded data slice.

11. The non-transitory computer readable storage device of claim 9, wherein the access request comprises one of:

a read request;

a write request; and a data storage integrity verification.

12. The non-transitory computer readable storage device of claim 9 further comprises:

a fourth storage section that stores operational instructions that, when executed by the container controller, causes the container controller to:

when the one or more storage units is in the storage failure mode and the container controller determines to rebuild an encoded data slice of the one or more encoded data slices:

determine whether a decode threshold number of encoded data slices of a set of encoded data slices of the one or more sets of encoded data slices is stored in the plurality of storage units within the storage container that includes the container controller, wherein the set of encoded data slices includes the encoded data slice; and when the decode threshold number of encoded data slices is stored in the plurality of storage units, rebuild the encoded data slice based on the decode threshold number of encoded data slices.

13. The non-transitory computer readable storage device of claim 12 further comprises:
the fourth storage section further stores operational instructions that, when executed by the container controller, causes the container controller to:
when the decode threshold number of encoded data slices is not stored in the plurality of storage units, forward a rebuild request for the encoded data slices to a site controller of the one or more site controllers;
a fifth storage section that stores operational instructions that, when executed by the site controller, causes the site controller to:
retrieve the decode threshold number of encoded data slices from a plurality of storage containers of the one or more storage containers; and
rebuild the encoded data slice based on the decode threshold number of encoded data slices.

14. The non-transitory computer readable storage device of claim 9 further comprises:
a fourth storage section that stores operational instructions that, when executed by the container controller, causes the container controller to:
when the one or more storage units is in the storage failure mode and the container controller determines to migrate the one or more encoded data slices:
determine whether the one or more sets of encoded data slices are stored in the plurality of storage units within the storage container that includes the container controller, wherein the set of encoded data slices includes the one or more encoded data slices; and
when the one or more encoded data slices are stored in the plurality of storage units, migrate the one or more encoded data slices to different storage locations within the plurality of storage units.

15. The non-transitory computer readable storage device of claim 14 further comprises:
the fourth storage section further stores operational instructions that, when executed by the container controller, causes the container controller to:
when the one or more encoded data slices are not stored in the plurality of storage units, forward a migrate request a site controller of the one or more site controllers; and
a fifth storage section that stores operational instructions that, when executed by the site controller, causes the site controller to:
migrate the one or more encoded data slices to different storage containers of the plurality of storage containers.

16. The non-transitory computer readable storage device of claim 9 further comprises:
a fourth storage section that stores operational instructions that, when executed by the container controller, causes the container controller to:
when the one or more storage units is in the storage failure mode and the container controller determines to change virtual to physical address mapping for the one or more encoded data slices:
detect a failure of a physical storage location within the plurality of storage units of the storage container, wherein the storage location is mapped to a DSN address of the one or more DSN addresses;
identify a different physical address location within the plurality of storage units that has not failed; and
map the DSN address to the different physical address location.

* * * * *